(12) United States Patent
Nishiyama et al.

(10) Patent No.: US 7,394,616 B2
(45) Date of Patent: *Jul. 1, 2008

(54) STORAGE APPARATUS CASING WITH INTERCHANGEABLE DISK DRIVE AND CONTROL BOXES

(75) Inventors: Shinichi Nishiyama, Ninomiya (JP); Shigeaki Tanaka, Odawara (JP); Yoji Okabe, Odawara (JP); Tadaharu Maeda, Chigasaki (JP); Kentarou Abe, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/505,839

(22) Filed: Aug. 18, 2006

(65) Prior Publication Data

US 2006/0279875 A1 Dec. 14, 2006

Related U.S. Application Data

(63) Continuation of application No. 10/765,108, filed on Jan. 28, 2004, now Pat. No. 7,113,364.

(30) Foreign Application Priority Data

Jun. 17, 2003 (JP) .............................. 2003-172536

(51) Int. Cl.
*G11B 33/02* (2006.01)
*G11B 33/12* (2006.01)
*G11B 33/14* (2006.01)

(52) U.S. Cl. ..................... 360/98.01; 361/685; 361/731; 720/654

(58) Field of Classification Search .............. 360/98.01; 361/685, 731; 720/654
See application file for complete search history.

(56) References Cited

U.S. PATENT DOCUMENTS 4,530,066 A 7/1985 Ohwaki et al.

| 4,811,275 | A | 3/1989 | Balogh, Jr. et al. |
| 5,206,772 | A | 4/1993 | Hirano et al. |
| 5,471,099 | A | 11/1995 | Larabell et al. |
| 5,506,750 | A | 4/1996 | Carteau et al. |

(Continued)

FOREIGN PATENT DOCUMENTS

| EP | 0242970 | 10/1987 |
| EP | 04 88679 A2 | 6/1992 |
| EP | 0 584 979 | 3/1994 |
| EP | 05 84979 A2 | 3/1994 |
| EP | 1026688 A2 | 8/2000 |

(Continued)

OTHER PUBLICATIONS

Schränke, 19"—Gehäuse, Klimatechnik (cupboards, 19 inch casings, air conditioning technology) Schroff Catalogue Aug. 2002, pp. 1.12.4, 1.90.2 (searched on Jan. 11, 2005) via http://www.schroff.de/internet/html d/ dervice/catalogue/index.html).

(Continued)

*Primary Examiner*—Craig A. Renner
(74) *Attorney, Agent, or Firm*—Mattingly, Stanger, Malur & Brundidge, P.C.

(57) ABSTRACT

The invention provides a casing for a storage apparatus having a first receiving portion for receiving a disc drive box in which a plurality of disc drives are received in a line, the first receiving portion being approximately equal in height and width to the disc drive box, and a second receiving portion for receiving a control portion box in which a plurality of control boards for executing a control relating to a data input and output process with respect to the disc drive are received in a line, the second receiving portion being approximately equal in height and width to the first receiving portion.

22 Claims, 19 Drawing Sheets

U.S. PATENT DOCUMENTS

| | | |
|---|---|---|
| 5,822,184 A | 10/1998 | Rabinovitz |
| 6,088,660 A | 7/2000 | Uno et al. |
| 6,510,050 B1 | 1/2003 | Lee et al. |
| 7,113,364 B2 * | 9/2006 | Nishiyama et al. ....... 360/98.01 |
| 2004/0037034 A1 | 2/2004 | Suzuki et al. |
| 2004/0064638 A1 | 4/2004 | Chong, Jr. |
| 2004/0083338 A1 | 4/2004 | Moriwaki et al. |

FOREIGN PATENT DOCUMENTS

| | | |
|---|---|---|
| EP | 1372155 A2 | 12/2003 |
| GB | 2 278 941 A | 12/1994 |
| JP | 5 204493 | 8/1993 |
| JP | 08-278834 | 10/1996 |
| WO | WO 96/14732 | 5/1996 |
| WO | WO 00/28545 | 5/2000 |

OTHER PUBLICATIONS

"Baugruppenträger, Gehäuse und Einschubtechnik" (Sub-racks, casings and plug-in technology) Schroff Catalogue Jun. 2001, pp. 2.60.0 and 2.64.0-2.64.5 (searched on Jan. 11, 2005 via http://www.schroff.de/internet/html d/service/catalog/index.html).

* cited by examiner

STORAGE APPARATUS CASING WITH INTERCHANGEABLE DISK DRIVE AND CONTROL BOXES

This application is a continuation of U.S. application Ser. No. 10/765,108, filed Jan. 28, 2004 now U.S. Pat. No. 7,113,364, now allowed, the entirety of which is incorporated herein by reference.

CROSS-REFERENCE TO RELATED APPLICATION

JP-A-2003-172536 applied on Jun. 17, 2003 in Japan is cited to support the present invention.

BACKGROUND OF THE INVENTION

1. Field of the Invention

The present invention relates to a casing for a storage apparatus and a storage apparatus.

2. Description of the Related Art

It is desired that a storage apparatus used as a memory device in an information processing system is flexibly structured from a small-scale structure to a large-scale structure in correspondence to the needs of users.

Accordingly, a storage apparatus can be generally changed to a scale corresponding to the user's needs by structuring a drive unit for receiving a disc drive and a control unit receiving a control portion for executing a control of an entire storage apparatus as the independent casings, and adding the drive unit as occasion demands.

Further, in the case of the small-scale structure in which the number of the onboard disc drives is small, there is a case that the storage apparatus is structured as an all-in-one unit in which minimum functions are received in one casing.

The apparatus structure mentioned above is described, for example, in JP-A-5-204493.

However, in the conventional storage apparatus, the casings for the control unit, the drive unit and the all-in-one unit are respectively manufactured for exclusive use. Accordingly, for example, in the case that the small-scale storage apparatus using the all-in-one unit is changed to the large-scale storage apparatus using the control unit and the drive unit, the casing for the all-in-one unit which has been employed can not be used. Further, since it is necessary to manufacture the different kinds of casing, a cost increase of the storage apparatus is caused.

SUMMARY OF THE INVENTION

The present invention is made by taking the problem mentioned above into consideration, and a main object of the present invention is to provide a casing for a storage apparatus and a storage apparatus.

In order to achieve the problem mentioned above, in accordance with the present invention, there is provided a casing for a storage apparatus comprising:

a first receiving portion for receiving a disc drive box in which a plurality of disc drives are received in a line, the first receiving portion being approximately equal in height and width to the disc drive box; and a second receiving portion for receiving a control portion box in which a plurality of control boards for executing a control relating to a data input and output process with respect to the disc drive are received in a line, the second receiving portion being approximately equal in height and width to the first receiving portion.

It is preferable that the casing for the storage apparatus is provided with a third receiving portion for receiving a power source portion for supplying an electric power to the control board and the disc drive, and the third receiving portion is provided in a lower portion of the second receiving portion.

Further, in accordance with the present invention, there is provided a storage apparatus comprising:

the casing for the storage having the structure mentioned above;

a plurality of the disc drives received in the disc drive box received in the first receiving portion;

a plurality of the control boards received in the control portion box received in the second receiving portion; and the power source portion received in the third receiving portion.

Further, in accordance with the present invention, there is provided a storage apparatus comprising:

a plurality of casings for the storage apparatus having the structure mentioned above, wherein in one of the casing for the storage apparatus, the disc drive box in which a plurality of the disc drives are received is received in the first receiving portion, the control portion box in which a plurality of the control boards are received is received in the second receiving portion, and the power source portion is received in the third receiving portion, and in the other of the casing for the storage apparatus, the disc drive box in which a plurality of the disc drives are received is received in each of the first receiving portion and the second receiving portion, and the power source portion is received in the third receiving portion.

In the storage apparatus mentioned above, it is preferable that the electric power to the control board and the disc drive by the power source portion is a direct current electric power having a uniform rated voltage.

Other objects, features and advantages of the invention will become apparent from the following description of the embodiments of the invention taken in conjunction with the accompanying drawings.

DESCRIPTION OF THE PREFERRED EMBODIMENT

A description will be in detail given below of an embodiment in accordance with the present invention with reference to the accompanying drawings.

First, a description will be given of a summary of an outer appearance of a conventional storage apparatus 1100 with reference to FIGS. 1 and 2.

Figure 1:
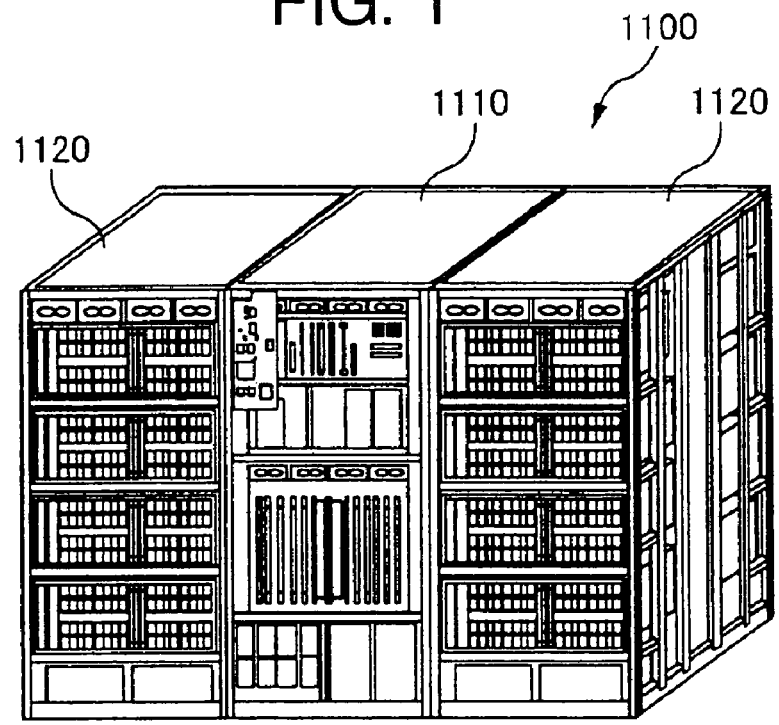
FIG. 1 is a view showing an outer appearance structure of a conventional storage apparatus.

The conventional storage apparatus 1100 shown in FIG. 1 is provided with a control unit 1110 and a drive unit 1120. In the embodiment shown in FIG. 1, the control unit 1110 is arranged in the center, and the drive units 1120 are arranged in the right and left of the control unit 1110.

The control unit 1110 controls an entire of the storage apparatus 1100. A logic portion 1420 controlling the entire of the storage apparatus 1100 is received in the control unit 1110, details thereof being described later. Further, a disc drive 1310 for storing data is received in the drive unit 1120.

In the case of enlarging the scale of the storage apparatus 1100, the drive unit 1120 is added. Accordingly, it is possible to flexibly change a storage capacity of the storage apparatus 1100 in correspondence to the user's needs, and it is possible to provide the storage apparatus 1100 having a high scalability. As the disc drive 1310, it is possible to employ various apparatuses, for example, a hard disc device, a semiconductor memory device and the like.

Figure 2:
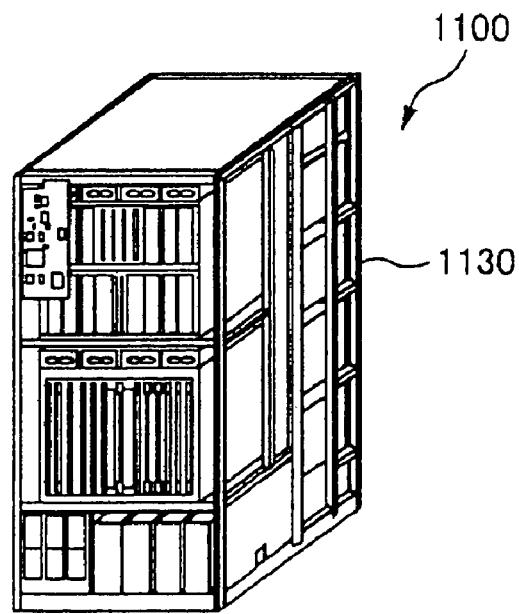
FIG. 2 is a view showing the outer appearance structure of the conventional storage apparatus.

On the other hand, the conventional storage apparatus 1100 shown in FIG. 2 is provided with an all-in-one unit 1130 in which the logic portion 1420 controlling the entire, and the disc drive 1310 for storing the data are received. The storage apparatus 1100 having the structure shown in FIG. 2 is structured such that minimum functions for the storage apparatus 1100 are received in one casing. FIG. 2 shows a view in the case that the storage apparatus 1100 is seen from a side in which the logic portion 1420 is received. The disc drive 1310 is received in an opposite side to the logic portion 1420. In the following description, the side in which the logic portion 1420 is received is also called as a front face side. Further, the side in which the disc drive 1310 is received is also called as a rear face side.

Figure 3:
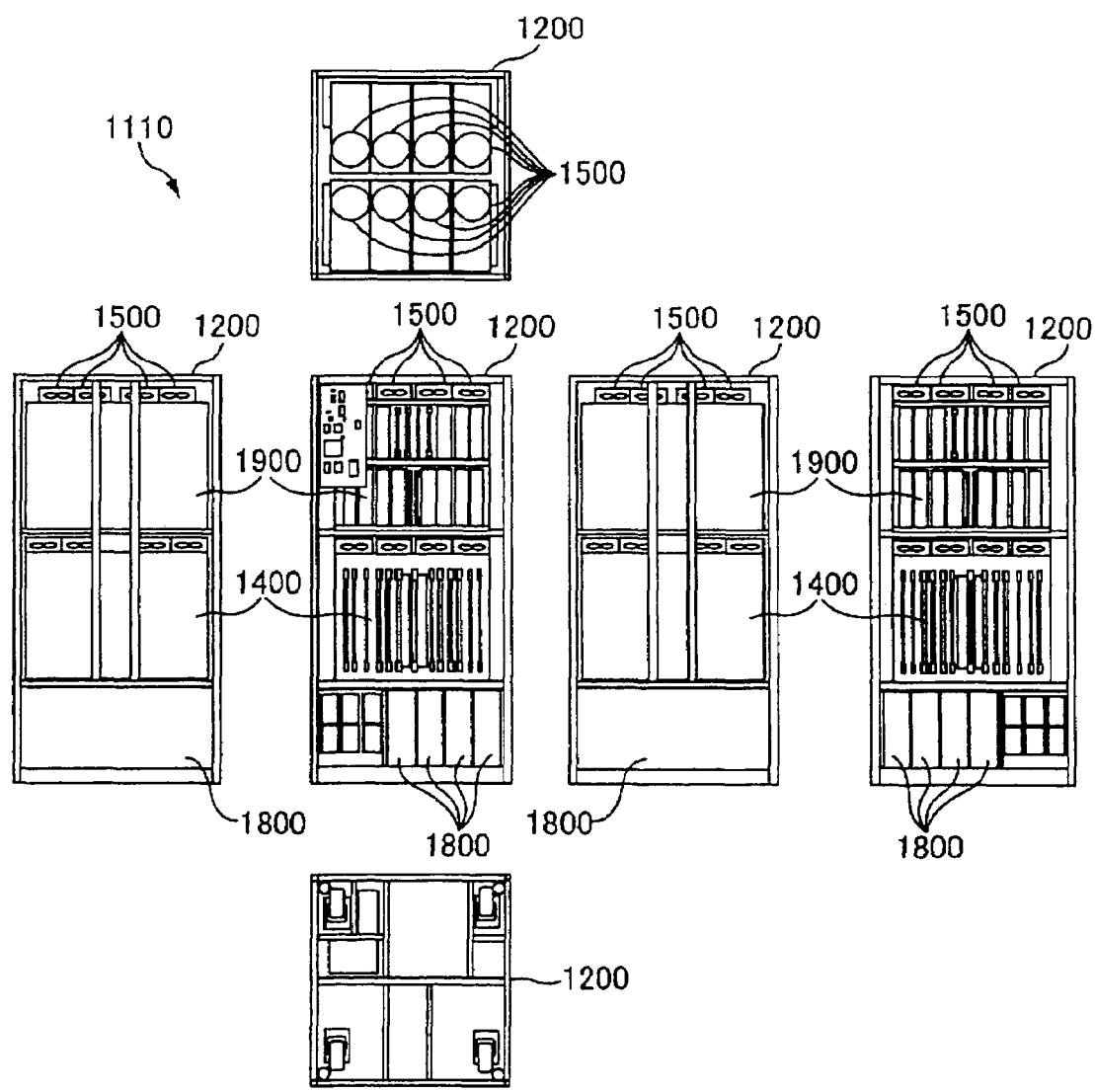
FIG. 3 is a view showing a detailed structure of a control unit of the conventional storage apparatus.
Figure 4:
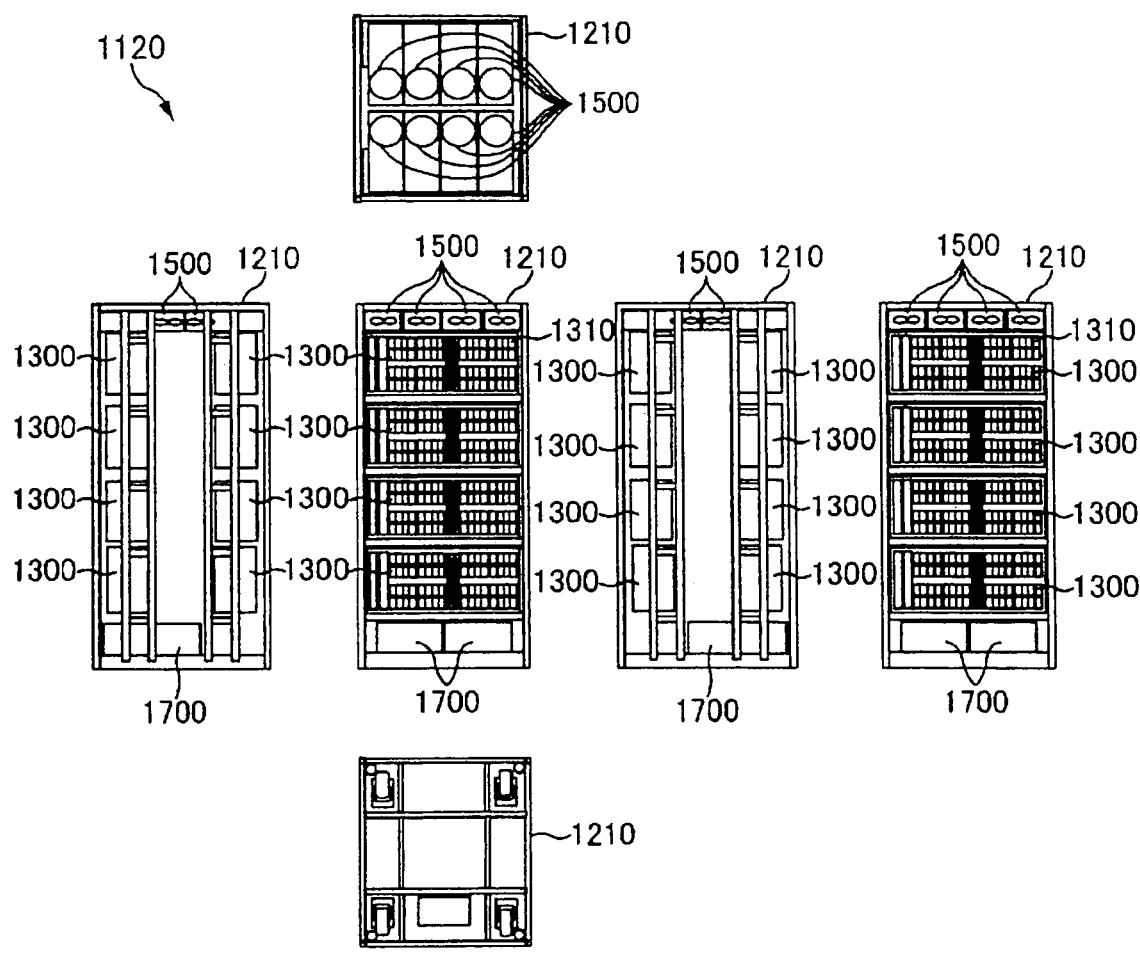
FIG. 4 is a view showing a detailed structure of a drive unit of the conventional storage apparatus.
Figure 5:
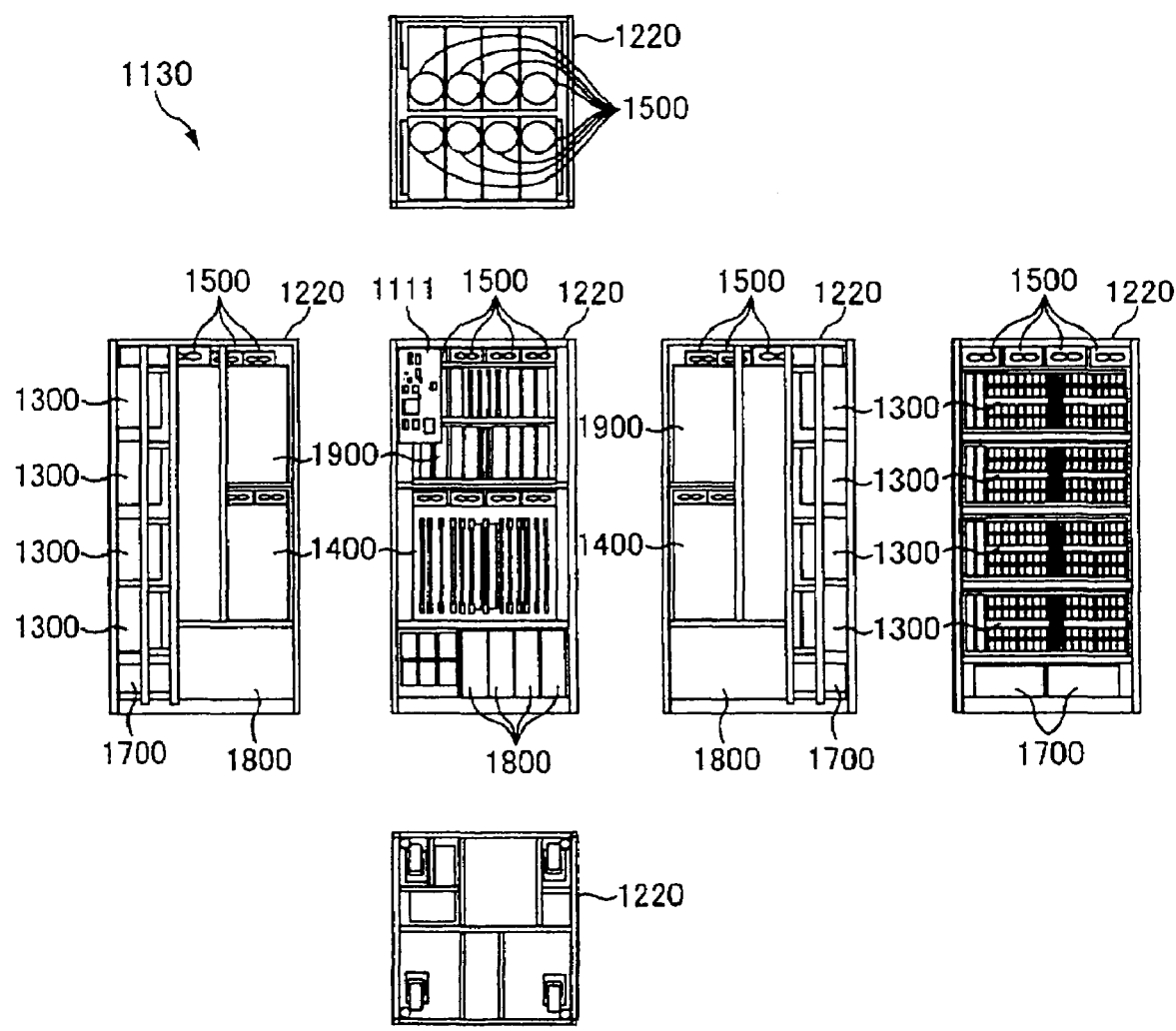
FIG. 5 is a view showing a detailed structure of an all-in-one unit of the conventional storage apparatus.
Figure 6:
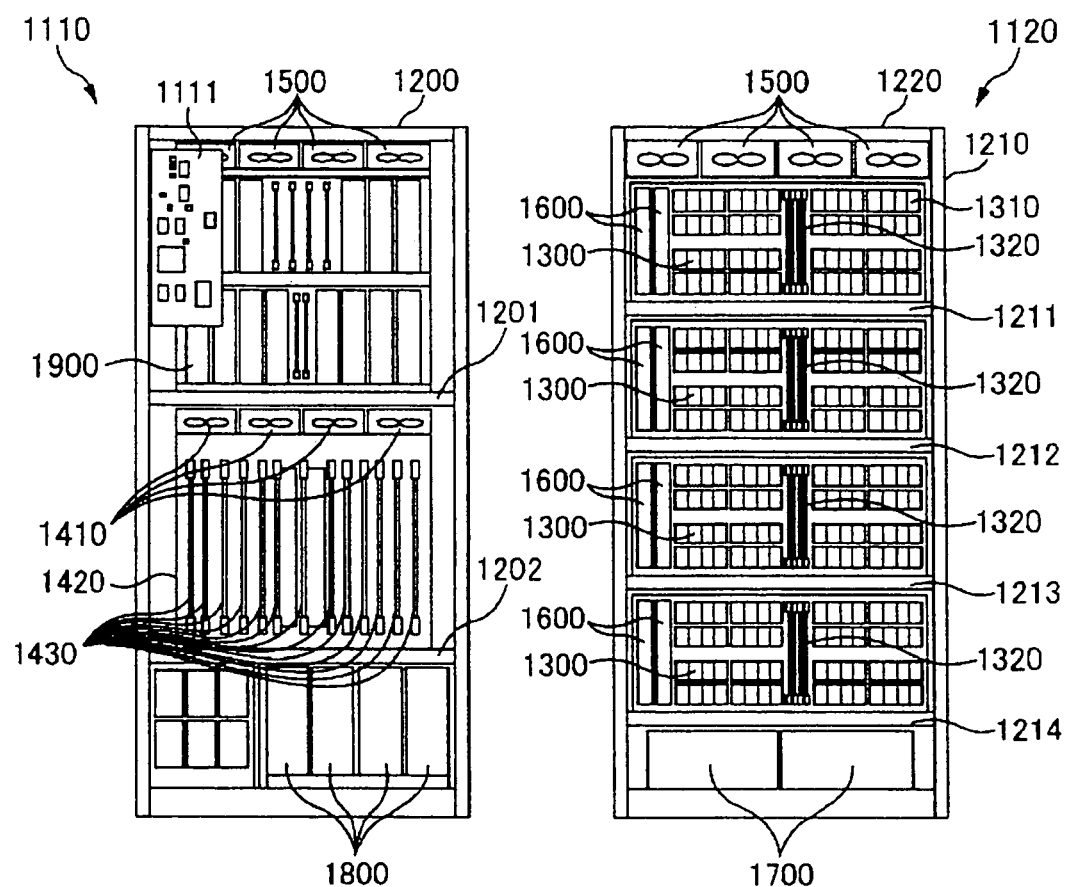
FIG. 6 is a view for comparing the control unit and the drive unit of the conventional storage apparatus.

Next, a description will be given below of a detailed structure of each of the conventional storage apparatuses 1100 shown in FIGS. 1 and 2 with reference to six-elevational views and front elevational views shown in FIGS. 3 to 6. FIG. 3 is a six-elevational view showing the control unit 1110, FIG. 4 is a six-elevational view showing the drive unit 1120, and FIG. 5 is a six-elevational view showing the all-in-one unit 1130. FIG. 6 is a view for comparing the control unit 1110, the drive unit 1120 and the all-in-one unit 1130.

First, a description will be given of a structure of the control unit 1110 with reference to FIGS. 3 and 6.

The control unit 1110 is structured such that a logic module 1400, a power source module 1900, a fan 1500 and a battery 1800 are received in the control unit casing 1200. Further, an operator panel 1111 for accepting a control input applied by an operator maintaining the storage apparatus 1100 is provided in the control apparatus 1110.

The logic module 1400 is detachably received in the control unit casing 1200. The logic module 1400 is provided with the logic portion 1420 for controlling the storage apparatus 1100, and a logic module fan 1410. A logic substrate 1430 is attached to the logic portion 1420, whereby various controls of the storage apparatus 1100 are executed. The logic substrate 1430 attached to the logic portion 1420 includes, for example, a channel adapter for communicating for inputting and outputting data with respect to the information processing apparatus utilizing the storage apparatus 1100 as the memory device, a disc adapter for executing an input-output processing with respect to the data stored in the disc drive 1310, a cash memory for storing the data given and received with respect to the information processing apparatus, and the like. The logic module fan 1410 discharges the air in an inner portion of the logic portion 1420. Accordingly, it is possible to cool the inner portion of the logic portion 1420. The air discharged from the logic portion 1420 is discharged to the outer portion of the control unit 1110 through an inner portion of the power source module 1900 by a fan 1500, details thereof being described later.

The power source module 1900 is detachably received in the control unit casing 1200. The power source module 1900 is provided with a power source unit for converting an ac power into a dc power, and supplying the dc power to the logic module 1400. Since it is necessary to supply a plurality of dc powers having different voltages to the logic module 1400 in correspondence to intended uses, the power source module 1900 is provided with the power source units in correspondence to the respective voltages. For example, the power source unit outputting the dc power having a rated voltage 12V is provided for the logic module fan 1410. Further, the power source units outputting the dc powers having rated voltages 5V and 3.3 V are provided for the logic substrate 1430.

The fan 1500 discharges the air in the inner portion of the control unit 1110 to the outer portion. Accordingly, it is possible to discharge the heat generated in the power source module 1900 and the logic module 1400 to the outer portion of the control unit 1110.

The battery 1800 corresponds to an auxiliary power source module for supplying a power to each of the devices in the inner portion of the control unit 1110, at a time of a power outage or at an abnormal time of the power source module 1900.

As shown in FIG. 3, the power source module 1900, the logic module 1400 and the battery 1800 are respectively received in an upper stage, a middle stage and a lower stage of the control unit casing 1200. Further, in a rear face side of the control unit casing 1200, in the same manner, the power source module 1900, the logic module 1400 and the battery 1800 are respectively received in the upper stage, the middle stage and the lower stage.

Next, a description will be given of the structure of the drive unit 1120 of the conventional storage apparatus 1100 with reference to FIGS. 4 and 6.

The drive unit 1120 is structured such that a disc drive module 1300, an AC-BOX 1700 and the fan 1500 are received in a drive unit casing 1210.

The disc drive module 1300 is detachably received in the drive unit casing 1210. The disc drive module 1300 receives a disc drive 1310 for storing the data, a DC power source 1600 and a port bypass circuit (PBC) 1320. The disc drive 1310 corresponds to an apparatus for storing the data, and is provided with a recording medium in an inner portion. The disc drive 1310 can employ various apparatuses, for example, a hard disc device, a semiconductor memory device and the like. The DC power source 1600 corresponds to a power source unit for converting the ac power into the dc power, and supplying the dc power to the disc drive 1310. The PBC 1320 corresponds to an apparatus for controlling a communication path between the logic portion 1420 provided in the control unit 1110 and the disc drive 1310.

The AC-BOX 1700 corresponds to an intake for the ac power with respect to the storage apparatus 1100, and functions as a breaker. The ac power taken in the AC-BOX 1700 is supplied to the DC power source 1600 of the disc drive module 1300, and the power source module 1900 of the control unit 1110.

The fan 1500 discharges the air in the inner portion of the drive unit 1120 to the outer portion. Accordingly, it is possible to discharge the heat generated in the disc drive module 1300 to the outer portion of the drive unit 1120.

In the embodiment shown in FIG. 4, the disc drive modules 1300 are received in a state of being laminated in four stages within the drive unit casing 1210. Further, the fan 1500 is provided in an upper portion of the disc drive module 1300, and the AC-BOX 1700 is provided in a lower portion thereof. Further, in a rear face side of the drive unit casing 1210, in the same manner, the disc drive modules 1300 are received in a state of being laminated in four stages, the fan 1500 is provided in an upper portion thereof, and the AC-BOX 1700 is provided in a lower portion thereof.

Next, a description will be given of the all-in-one unit 1130 of the conventional storage apparatus 1100 with reference to FIGS. 5 and 6.

The all-in-one unit 1130 is structured such that the logic module 1400, the power source module 1900, the fan 1500 and the battery 1800 are received in a front face side of an all-in-one unit casing 1220, and the disc drive module 1300, the AC-BOX 1700 and the fan 1500 are received in a rear face side. The modules are respectively the same as those received in the control unit 1110 and the drive unit 1120. Further, receiving positions of the modules are respectively the same as those in the control unit 1110 and the drive unit 1120. Further, in the same manner as the control unit 1110 and the drive unit 1120, the respective modules are detachably received in the all-in-one unit casing 1220.

In the all-in-one unit 1130, since the respective modules received in the control unit 1110 and the drive unit 1120 are received in the all-in-one unit casing 1220, as mentioned above, the storage apparatus 1100 can be structured by the all-in-one unit 1130.

Next, a description will be given of differences among the control unit 1110, the drive unit 1120 and the all-in-one unit 1130 described above with reference to FIGS. 6 and 7. In this case, a view shown in a left side in FIG. 6 illustrates the control unit 1110, and the same matter is applied to the front face side of the all-in-one unit 1130. Further, a view shown in a right side in FIG. 6 illustrates the drive unit 1120, and the same matter is applied to the rear face side of the all-in-one unit 1130. Accordingly, the differences among the control unit 1110, the drive unit 1120 and the all-in-one unit 1130 can be explained by describing the difference between the control unit 1110 and the drive unit 1120 shown in FIG. 6.

The control unit 1110 is largely sectioned into the upper stage, the middle stage and the lower stage. The power source module 1900 is received in the upper stage, the logic module 1400 is received in the middle stage, and the battery 1800 is received in the lower stage. The control unit casing 1200 for receiving the respective modules and the like is provided with an upper partition portion 1201 and a lower partition portion 1202, and the respective modules and the like are received in a sectioned manner by the partition portions.

The drive unit 1120 is structured such that the disc drive modules 1300 are laminated in four stages, the fan 1500 is arranged in the upper portion thereof and the AC-BOX 1700 is arranged in the lower portion thereof. Further, the disc drives 1310 respectively received in the disc drive modules 1300 are received in a state of being laminated in four stages. The drive unit casing 1210 for receiving the respective modules and the like is provided with an upper partition portion 1211, a middle partition portion 1 (1212), a middle partition portion 2 (1213) and a lower partition portion 1214, and the respective modules and the like are received in a sectioned manner by the partition portions. In this case, in the embodiment shown in FIG. 6, no partition portion is provided between the fan 1500 and the disc drive module 1300, however, the partition portion may be provided.

Figure 7:
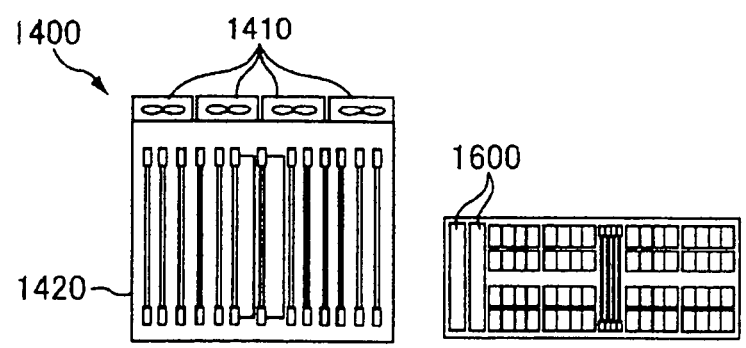
FIG. 7 is a view for comparing a control portion box and a disc drive box of the conventional storage apparatus.

As shown in FIG. 6, the position of the partition portion is different between the control unit casing 1200 and the drive unit casing 1210. One of the reasons is that a height and a width of the logic module 1400 are respectively different from a height and a width of the disc drive module 1300, as shown in FIG. 7.

Accordingly, in the conventional storage apparatus 1100, it is necessary to manufacture the control unit casing 1200, the drive unit casing 1210 and the all-in-one unit casing 1220 respectively for exclusive use, and it is necessary for the user operating and controlling the storage apparatus 1100 to buy the new casing at a time of changing the structure of the storage apparatus 1100. Accordingly, it is required to make the casings for the storage apparatuses 1100 in common.

In the storage apparatus 100 in accordance with the present embodiment, a casing for the storage apparatus 100 (a storage apparatus casing) 200 is designed to be in common. First, an outer appearance structure of the storage apparatus 100 in accordance with the present embodiment is shown in FIGS. 8 and 9.

Figure 8:
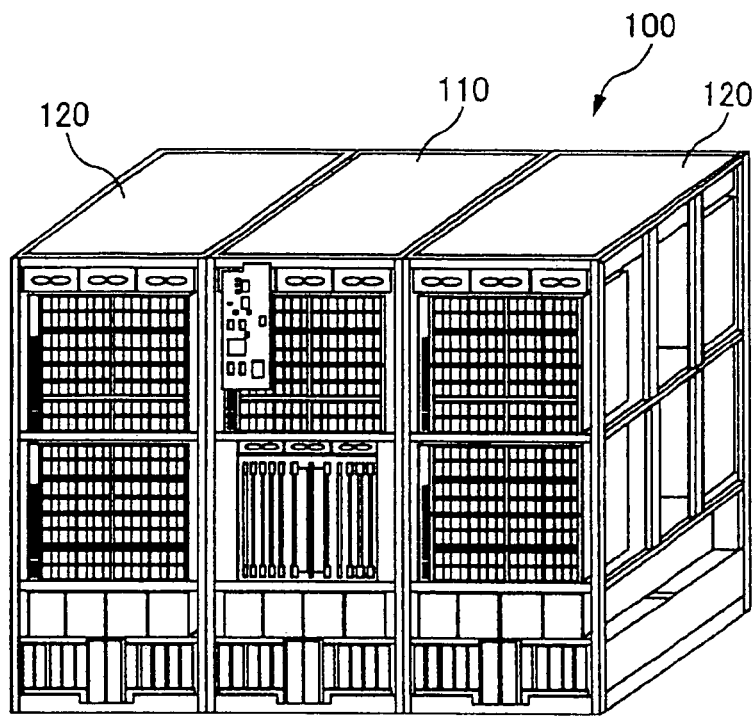
FIG. 8 is a view showing an outer appearance of a storage apparatus in accordance with the present embodiment.
Figure 9:
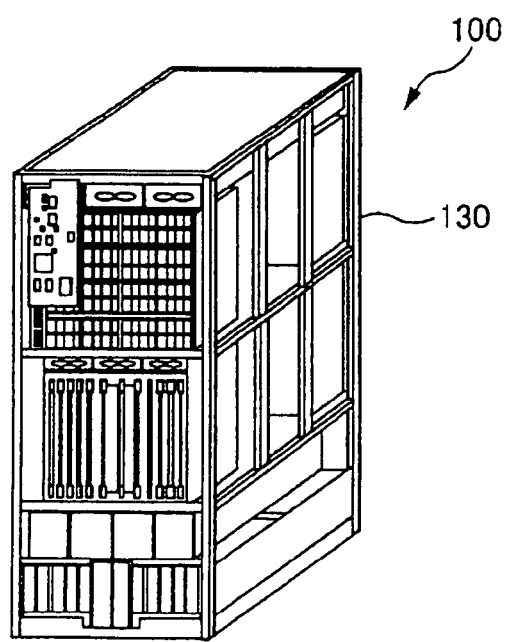
FIG. 9 is a view showing the outer appearance of the storage apparatus in accordance with the present embodiment.

The storage apparatus 100 in accordance with the present embodiment shown in FIG. 8 is provided with a control unit 110 and a drive unit 120. In the embodiment shown in FIG. 8, the control unit 110 is arranged in the center, and the drive units 120 are arranged in the right and left of the control unit 110.

The control unit 110 controls an entire of the storage apparatus 100. A logic portion 420 controlling the entire of the storage apparatus 100 is received in the control unit 110, details thereof being described later. Further, a disc drive 310 for storing data is received therein. Further, a DC power source 600, a battery 800 and an AC-BOX 700 are also received therein. A rear face side of the control unit 110 is structured in the same manner.

On the other hand, the disc drive 310 for storing the data is received in the drive unit 120. Further, the DC power source 600, the battery 800 and the AC-BOX 700 are also received therein. A rear face side of the drive unit 120 is structured in the same manner. In the case of enlarging the scale of the storage apparatus 100, the drive unit 120 is added. Accordingly, it is possible to flexibly change a memory capacity of the storage apparatus 100 in correspondence to the user's needs, and it is possible to provide the storage apparatus 100 having a high scalability.

Further, the storage apparatus 100 shown in FIG. 9 is provided with an all-in-one unit 130 in which the logic portion 420 controlling the entire, the disc drive 310 for storing the data, the DC power source 600, the battery 800, and the AC-BOX 700 are received. The storage apparatus 100 having the structure shown in FIG. 9 is structured such that minimum functions for the storage apparatus 100 are received within one casing. A rear face side is structured in the same manner. The all-in-one unit 130 in accordance with the present embodiment is structured in the same manner as the control unit 110 shown in FIG. 8.

Next, a description will be given of the way how the control unit 110, the drive unit 120 and the all-in-one unit 130 are respectively structured by using the common casing 200, with reference to FIGS. 10 to 12.

Figure 10:
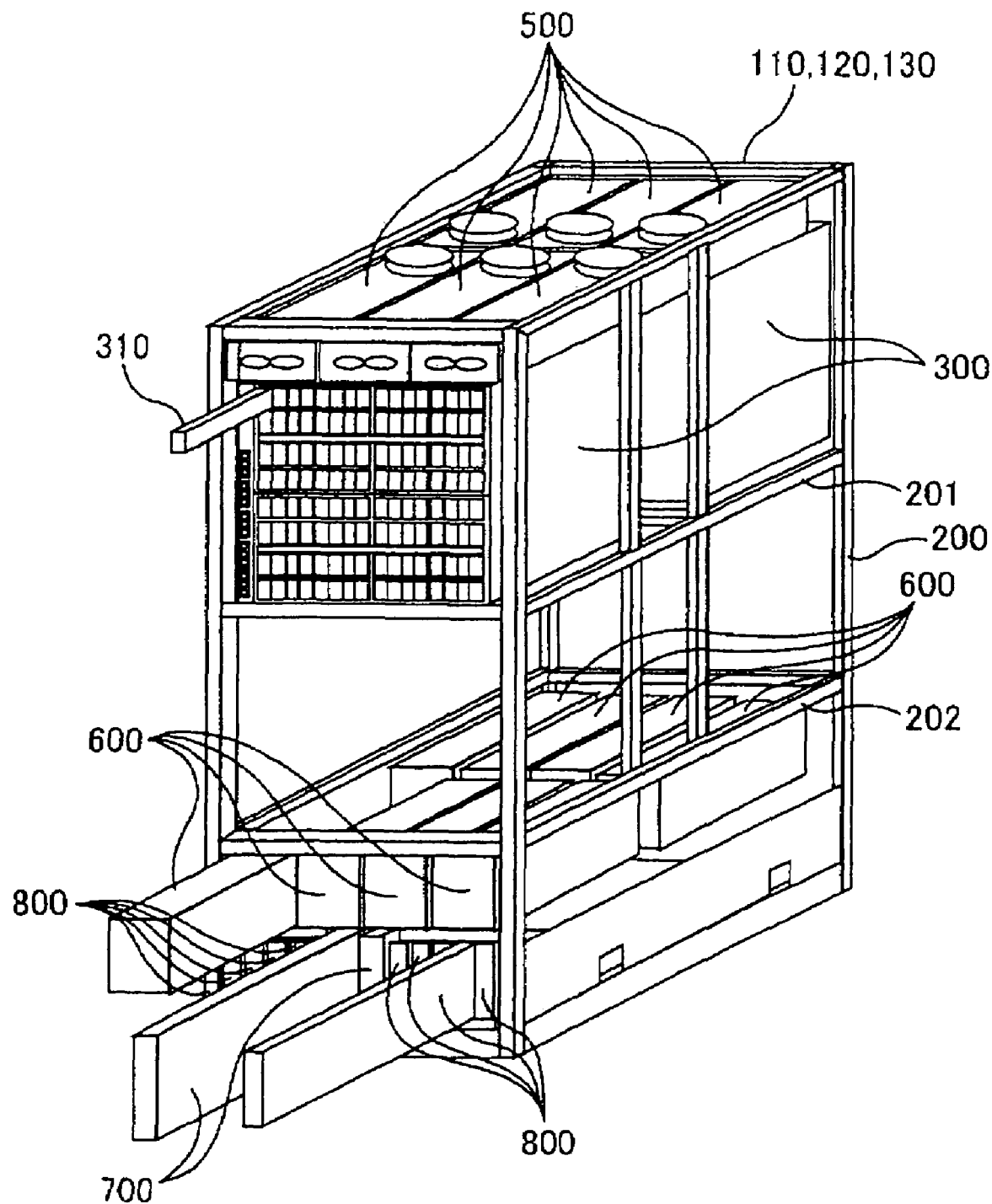
FIG. 10 is a view for explaining a detailed structure of the storage apparatus in accordance with the present embodiment.

FIG. 10 is a view showing a structure which is in common with the control unit 110, the drive unit 120 and the all-in-one unit 130. In other words, a disc drive module (a disc drive box) 300 in which a plurality of disc drives 310 are received in a state of being aligned is received in an upper stage (a first receiving portion) of the casing 200, and the battery 800, the AC-BOX 700 and the DC power source 600 are received in a lower stage (a third receiving portion). In this case, the battery 800, the AC-BOX 700 and the DC power source 600 correspond to the power source portion. Of course, the power source portion may be structured by at least any one of these elements, or may include any other constituting elements than these elements. Further, a fan 500 is arranged in an upper portion of the disc drive module 300. In the case of the control unit 110 or the all-in-one unit 130, a logic module (a logic portion box) 400 is received in a middle stage (a second receiving portion), and in the case of the drive unit 120, the disc drive module 300 is received in the middle stage.

AS mentioned above, a height and a width of the upper stage of the casing 200 are respectively formed so as to be approximately equal to the height and the width of the disc drive module 300, so that the disc drive module 300 can be received in the upper stage.

In this case, the disc drive module 300 in the upper stage is detachably received in the casing 200. Further, the disc drive 310 is detachably received in the disc drive module 300. The battery 800, the AC-BOX 700 and the DC power source 600 in the lower stage are detachably received in the casing 200.

The upper stage, the middle stage and the lower stage of the casing 200 are sectioned by an upper partition portion 201 and a lower partition portion 202.

The control unit 110 and the all-in-one unit 130 can be structured by receiving the logic module 400 in the middle stage of the casing 200. The state is shown in FIG. 11.

Further, the drive unit 120 can be structured by receiving the disc drive module 300 in the middle stage of the casing 200. The state is shown in FIG. 12. The disc drive module 300 received in the middle stage of the casing 200 is the same as the disc drive module 300 received in the upper stage of the casing 200.

In the casing 200 in accordance with the present embodiment, the upper stage and the middle stage are formed such that the heights and the widths are approximately equal to each other, respectively. Accordingly, not only the logic module 400, but also the disc drive module 300 can be received in the middle stage.

Accordingly, for example, in the case of enlarging the scale of the storage apparatus 100, the casing 200 which is used for the all-in-one unit 130 can be utilized for the drive unit 120. In this case, FIGS. 11 and 12 shows the embodiment in the case that both of the logic module 400 and the disc drive module 300 can be received in the middle stage of the casing 200, however, the structure may be made such that both the modules can be received in the upper stage in addition to the middle stage of the casing 200. Further, the structure can be made such that only the middle stage or only the upper stage can receive both the modules.

As mentioned above, in the present embodiment, each of the control unit 110, the drive unit 120 and the all-in-one unit 130 can be structured by using the common casing 200.

Figure 13:
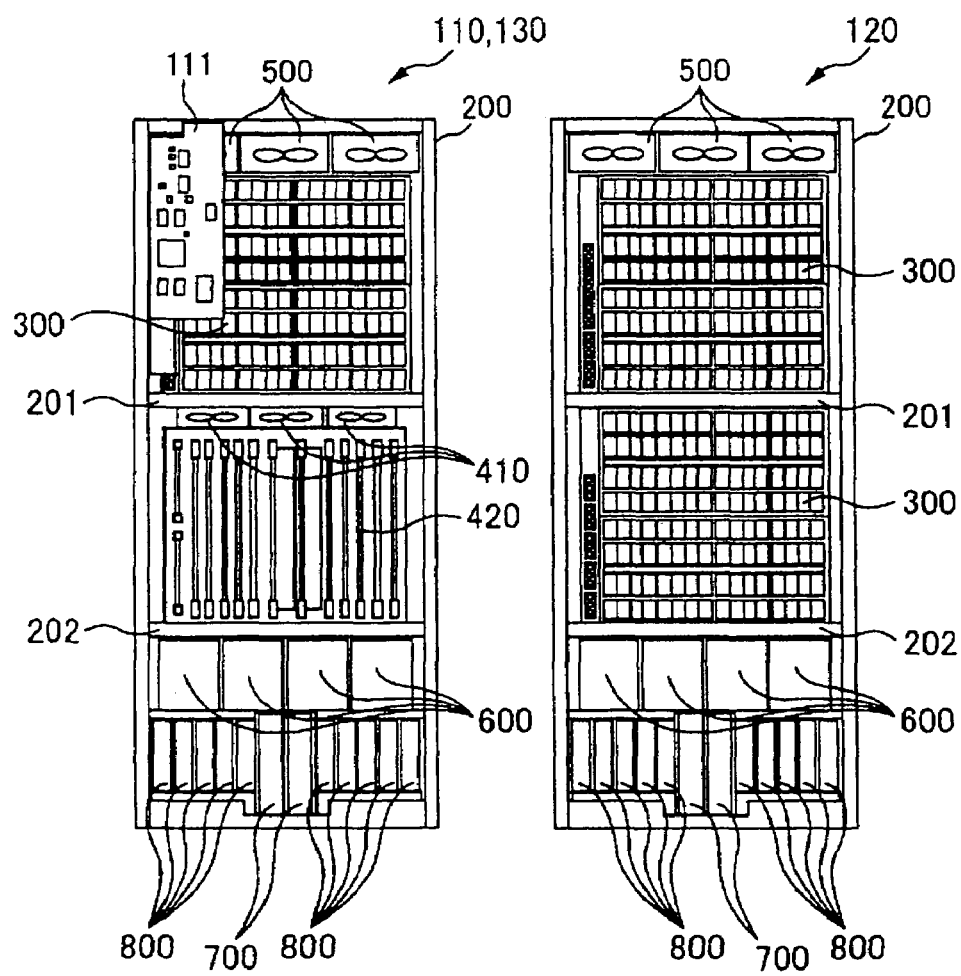
FIG. 13 is a view for comparing the control unit and the drive unit of the storage apparatus in accordance with the present embodiment.
Figure 14:
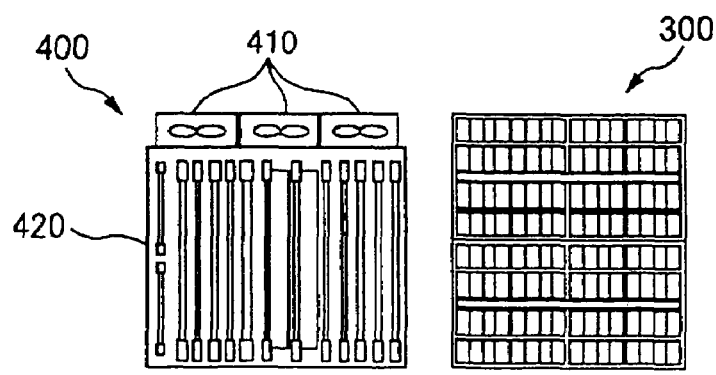
FIG. 14 is a view for comparing the control portion box and the disc drive box of the storage apparatus in accordance with the present embodiment.
Figure 15:
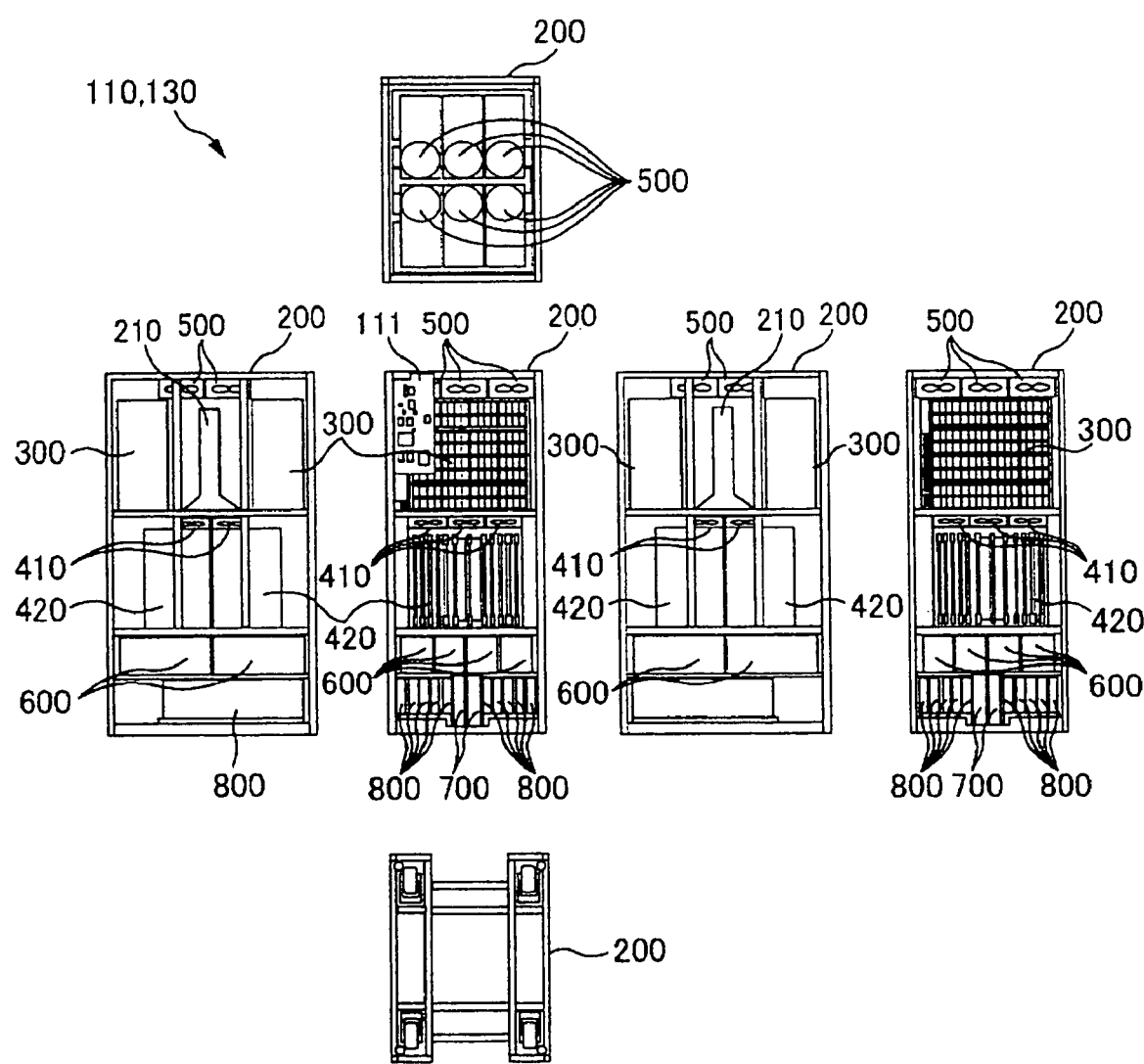
FIG. 15 is a view showing a detailed structure of the control unit of the storage apparatus in accordance with the present embodiment.
Figure 16:
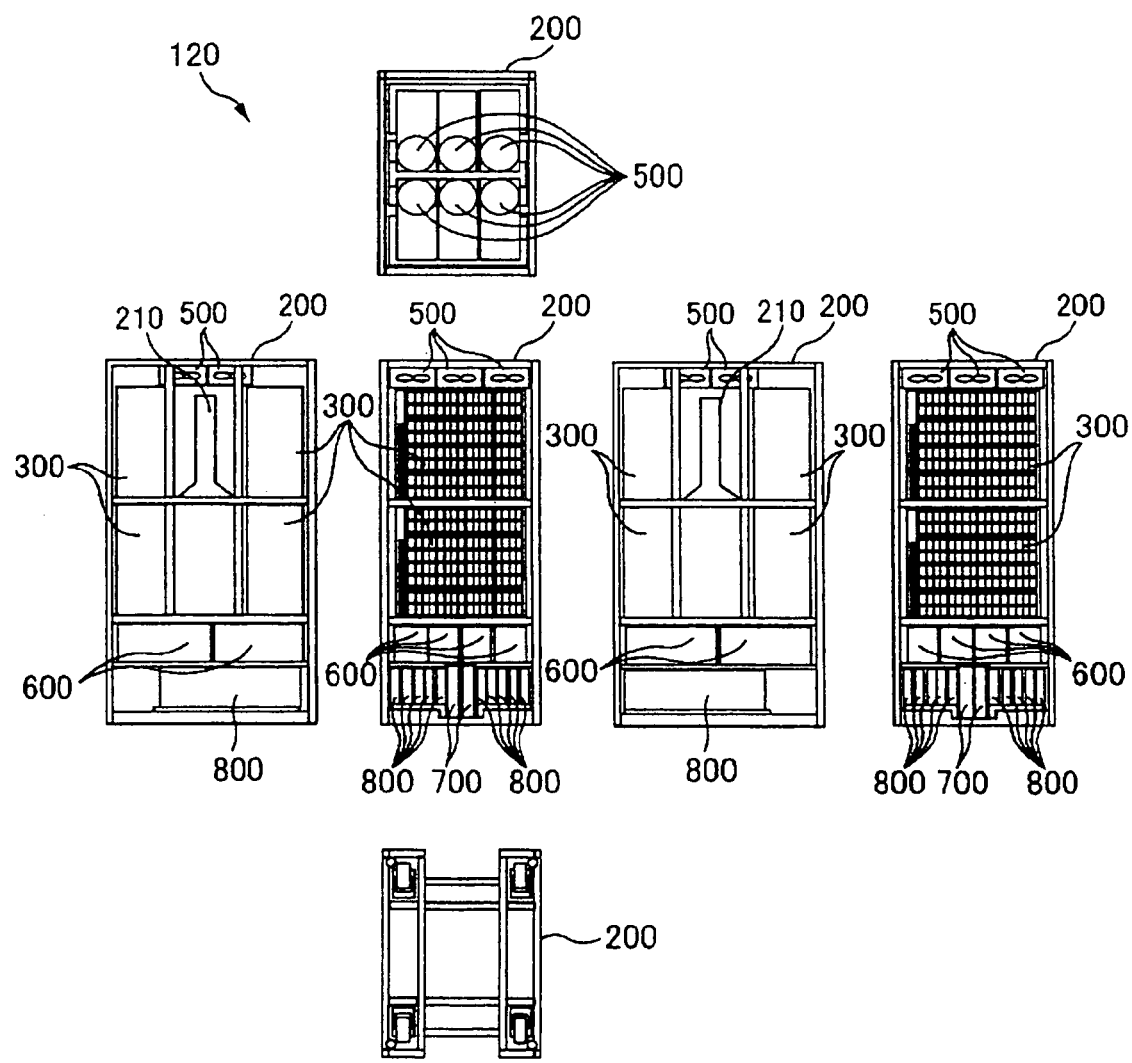
FIG. 16 is a view showing a detailed structure of the drive unit of the storage apparatus in accordance with the present embodiment.

In the storage apparatus 100 in accordance with the present embodiment, FIG. 13 shows the structure in which the upper stage and the middle stage of the casing 200 are formed such that the heights and the widths are approximately equal to each other. Further, FIG. 14 shows a view for comparing the heights and the widths of the logic module 400 and the disc drive module 300. Further, FIG. 15 shows a six-elevational view illustrating a detailed structure of the control unit 110 and the all-in-one unit 130. Further, FIG. 16 shows a six-elevational view illustrating a detailed structure of the drive unit 120.

First, a description will be given of the structures of the control unit 110 and the all-in-one unit 130 in accordance with the present embodiment, with reference to FIGS. 13 to 15.

The control unit 110 and the all-in-one unit 130 are structured such that the logic module 400, the disc drive module 300, the DC power source 600, the AC-BOX 700, the battery 800 and the fan 500 are received in the casing 200. Further, the control unit 110 and the all-in-one unit 130 are provided with an operator panel 111 for accepting a control input applied by an operator maintaining the storage apparatus 100.

Figure 11:
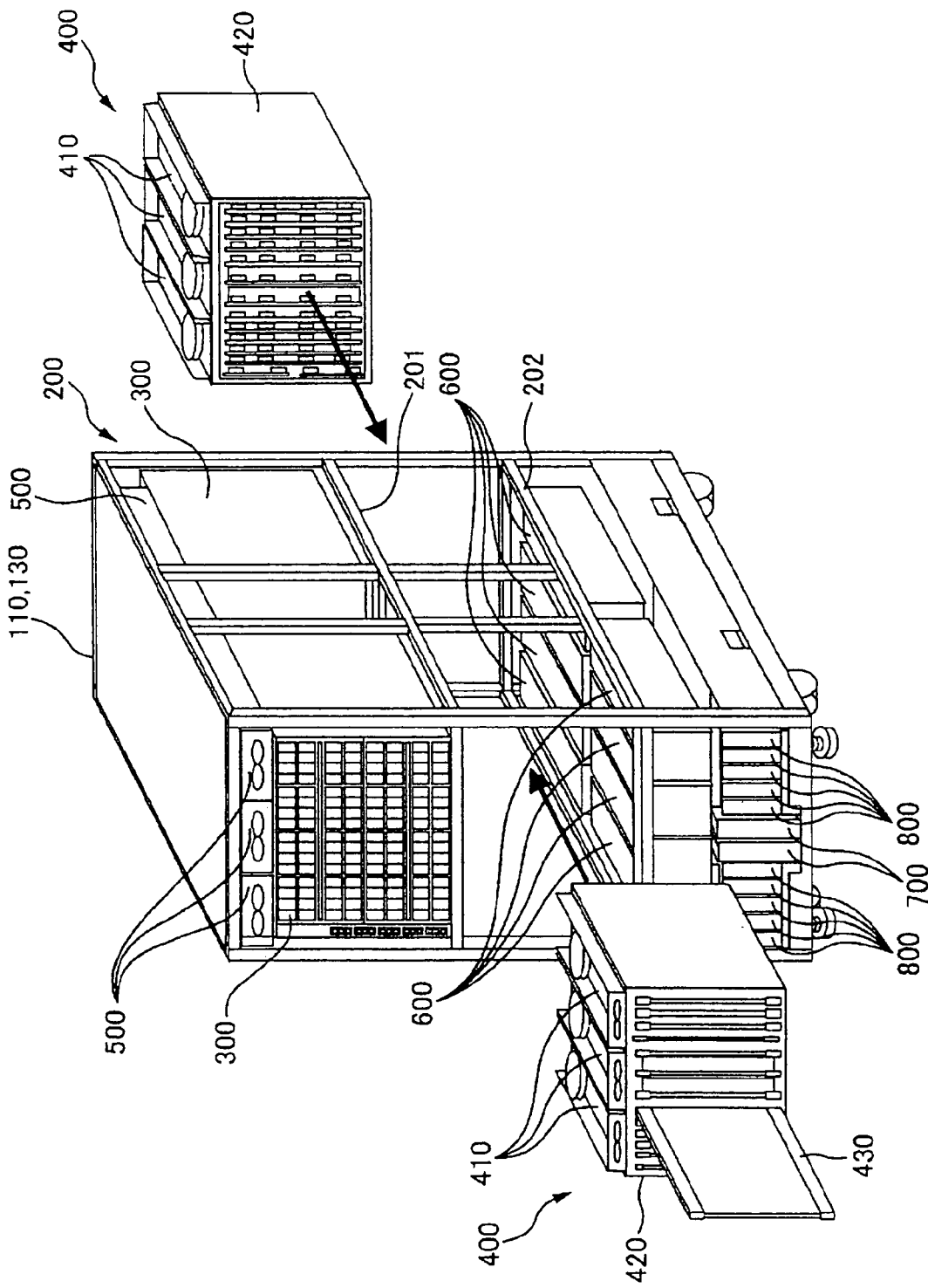
FIG. 11 is a view for showing a state in which a control portion box is received in a control unit of the storage apparatus in accordance with the present embodiment.
Figure 12:
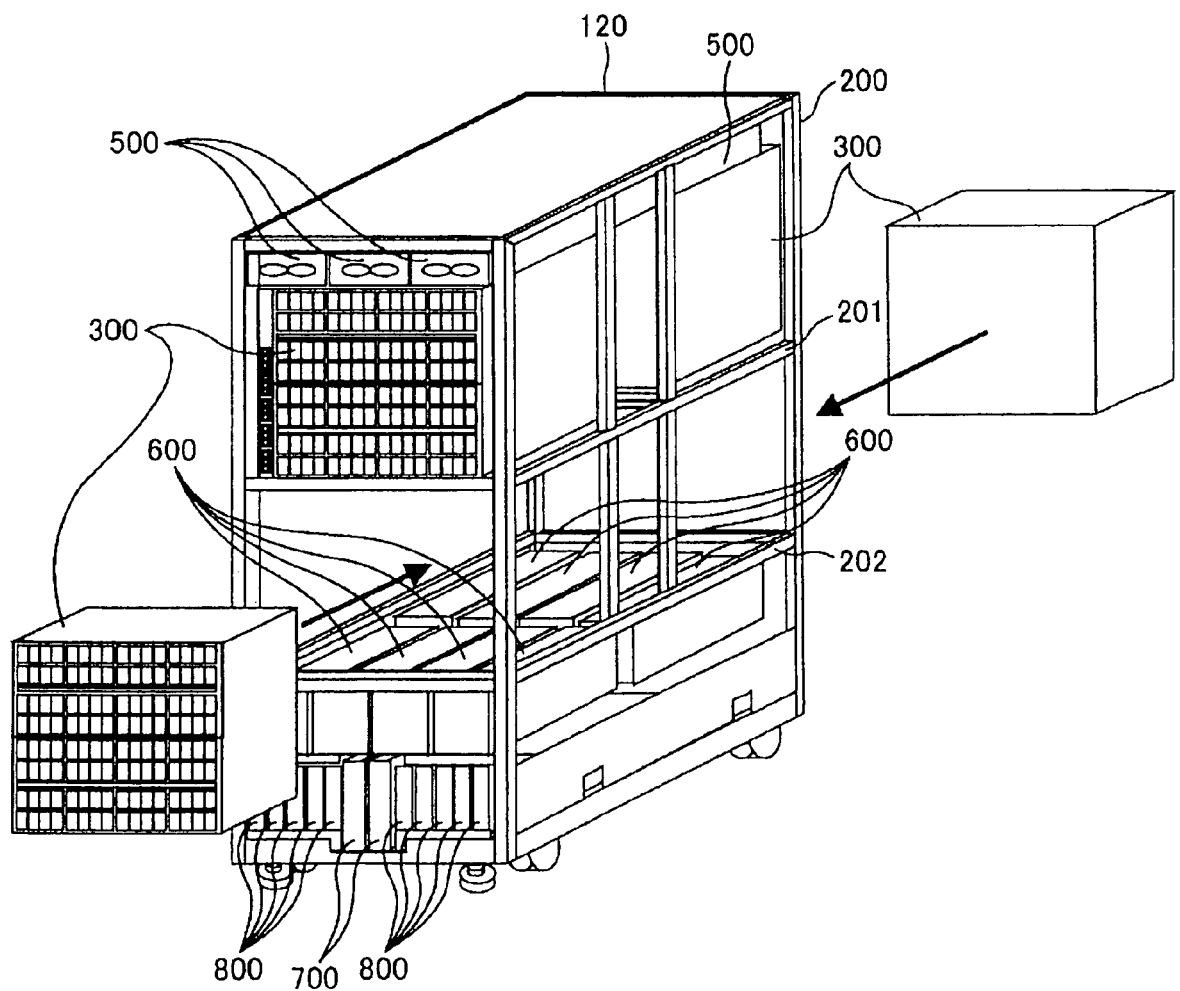
FIG. 12 is a view for showing a state in which a disc drive box is received in a drive unit of the storage apparatus in accordance with the present embodiment.

As described by using FIG. 11, the logic module 400 is detachably received in the casing 200. The logic module 400 is provided with the logic portion 420 for controlling the storage apparatus 100, and a logic module fan 410. A logic substrate (a control board for executing a control relating to a data inputting and outputting process with respect to the disc drive) 430 is received in the logic portion 420 detachably in a aligned manner, whereby various controls of the storage apparatus 100 are executed. The logic substrate 430 received in the logic portion 420 includes, for example, a channel adapter for communicating for inputting and outputting data with respect to the information processing apparatus utilizing the storage apparatus 100 as the memory device, a disc adapter for executing an input-output processing with respect to the data stored in the disc drive 310, a cash memory for storing the data given and received with respect to the information processing apparatus, and the like. In this case, the logic substrates 430 are not only received in the logic portion 420 in such a manner that all of the logic substrates 430 are aligned in the same direction, as shown in FIG. 13 or 11, but also can be received, for example, in such a manner that the logic substrate 430 aligned in a vertical direction and the logic substrate 430 aligned in a horizontal direction are mixed.

The logic module fan 410 discharges the air in an inner portion of the logic portion 420. Accordingly, it is possible to cool the inner portion of the logic portion 420. The air discharged from the logic portion 420 is discharged to the outer portion of the control unit 110 and the all-in-one unit 130 through an inner portion of an air duct (a duct) 210 provided in the inner portion of the casing 200, by a fan 500, details thereof being described later.

The disc drive module 300 is detachably received in the casing 200. The disc drive module 300 receives a disc drive 310 for storing the data. The disc drive 310 corresponds to an apparatus for storing the data, and is provided with a recording medium in an inner portion. The disc drive 310 can employ various apparatuses, for example, a hard disc device, a semiconductor memory device and the like. As shown in FIG. 13, the disc drives 310 are received in the disc drive module 300 in accordance with the present embodiment in a state in which the disc drives 310 are laminated in eight stages. Accordingly, the height of the disc drive module 300 in accordance with the present embodiment can be made approximately the same as the height of the logic module 400.

The fan 500 discharges the air in the inner portion of the control unit 110 or the all-in-one unit 130 to the outer portion. Accordingly, it is possible to discharge the heat generated in the disc drive module 300 and the logic module 400 to the outer portion of the control unit 110 and the all-in-one unit 130. In this case, the control unit 110 and the all-in-one unit 130 are provided with the air duct 210 in the inner portion thereof, details thereof being mentioned later. The air in the inner portion of the logic module 400 received in the middle stage of the casing 200 is discharged to the outer portion of the control unit 110 and the all-in-one unit 130 through the inner portion of the air duct 210 by the fan 500.

The DC power source 600, the AC-BOX 700 and the battery 800 are received in the lower portion (the third receiving portion) of the casing 200 (the DC power source 600, the AC-BOX 700 and the battery 800 correspond to the power source portion). The power source portion is detachably received in the casing 200. The DC power source 600 is provided with a power source unit for converting the ac power to the dc power and supplying the dc power to the logic module 400 and the disc drive 310. The logic module 400 and the disc drive 310 are respectively actuated by the dc powers having the different voltages, in the same manner as that of the conventional storage apparatus 1100, however, in the present embodiment, the dc power having the same rated voltage is supplied from the DC power source 600 to the logic module 400 and the disc drive 310. Further, the logic module 400 and the disc drive 310 to which the power having the same voltage is supplied respectively convert the voltage into their respective voltages by a voltage converting apparatus (a DC/DC converter) provided in the inner portion thereof.

Further, in the control unit 110 and the all-in-one unit 130 in accordance with the present embodiment, the DC power source 600 for supplying the dc power to the disc drive 310 is received in the lower stage of the casing 200. Accordingly, since the DC power source 1600 which is conventionally received in the disc drive module 1300 can be removed from the disc drive module 1300, it is possible to make the width of the disc drive module 300 approximately equal to the width of the logic module 400 in accordance with the present embodiment.

The battery 800 corresponds to an auxiliary power source apparatus for supplying the power to each of the devices in the inner portion of the control unit 110 and the all-in-one unit 130 at a time of a power outage or at an abnormal time of the DC power source 600.

The AC-BOX 700 corresponds to an intake for the ac power with respect to the storage apparatus 100, and functions as a breaker. The ac power taken in the AC-BOX 700 is supplied to the DC power source 600.

As mentioned above, in the control unit 110 and the all-in-one unit 130 in accordance with the present embodiment, the power source portions are put together in the lower portion of the casing 200. Accordingly, it is unnecessary to arrange the wiring for the ac power in the inner portions of the control unit 110 and the all-in-one unit 130.

Further, since the voltage converting apparatus is provided in the inner portions of the logic module 400 and the disc drive 300, it is unnecessary to arrange the wiring for supplying the ac powers having the different voltages in the inner portions of the control unit 110 and the all-in-one unit 130. Accordingly, it is possible to simplify the wire arrangement within the casing 200, and it is possible to make manufacturing, maintaining and repairing the storage apparatus 100 easy and improve a safety. Further, since it is possible to make it hard to be exposed to the influence with respect to the noise, it is possible to improve a reliability of the storage apparatus 100.

Figure 25:
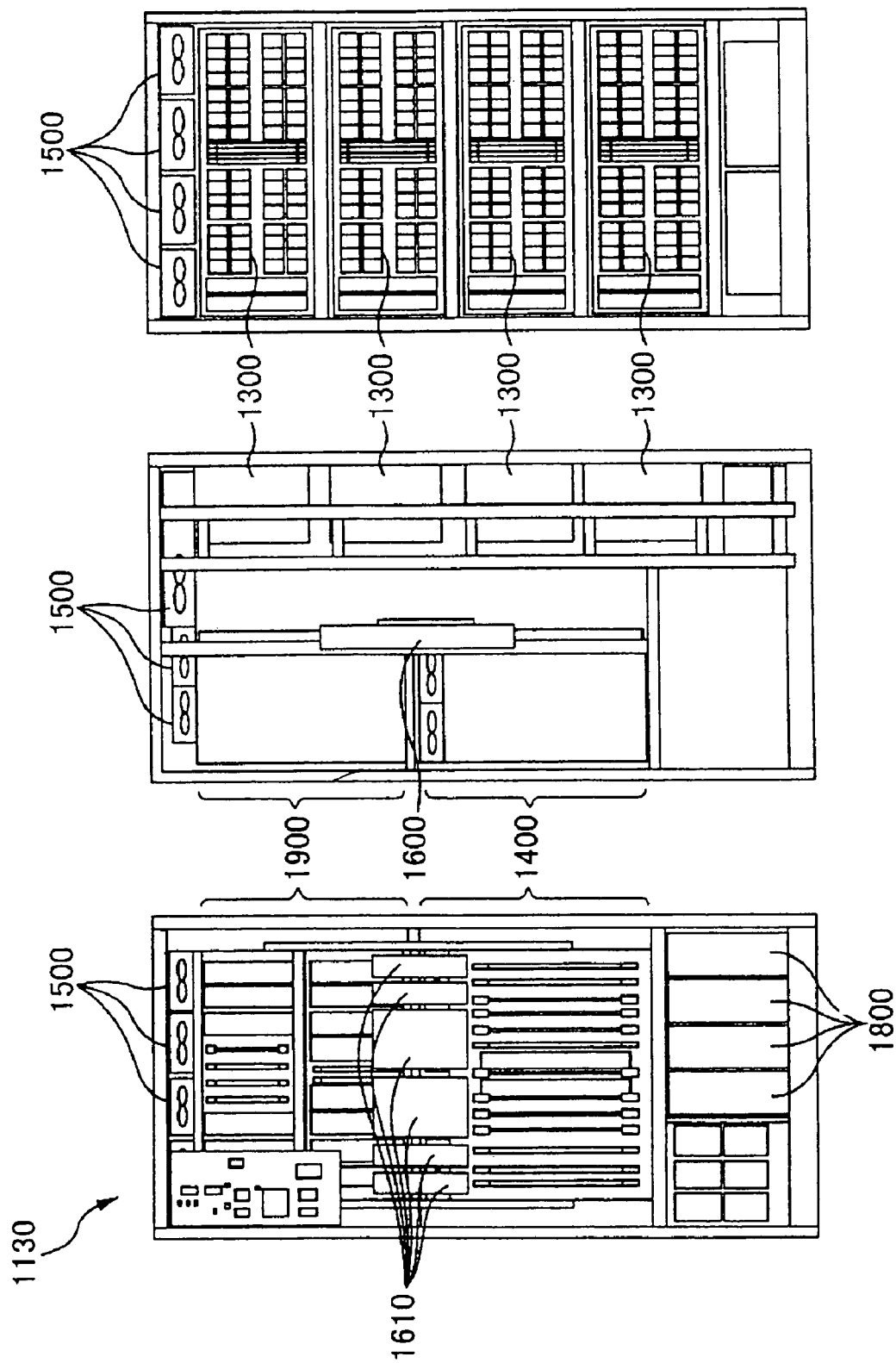
FIG. 25 is a view for explaining a bus bar provided in the conventional storage apparatus.
Figure 26:
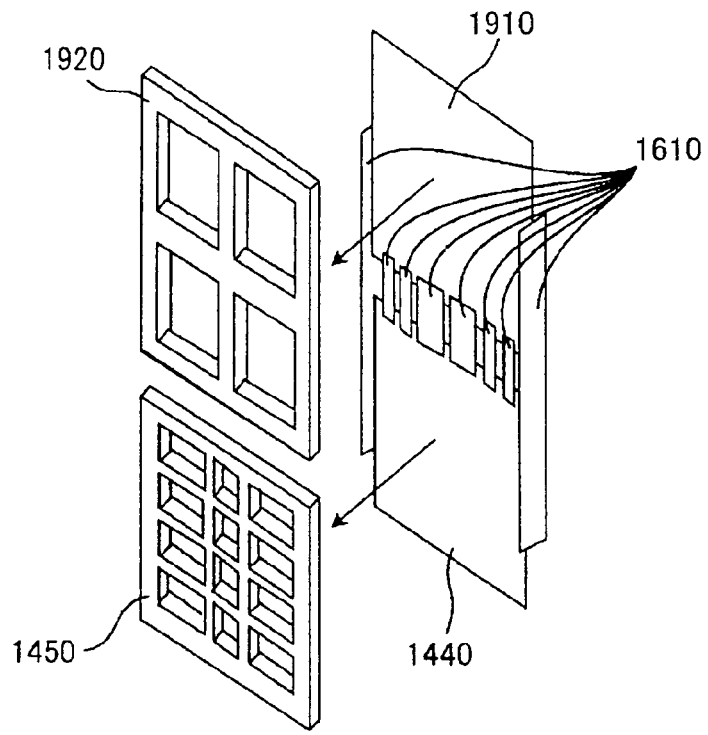
FIG. 26 is a view for explaining the bus bar provided in the conventional storage apparatus.

A state thereof will be shown in FIGS. 25 to 28. FIGS. 25 to 28 are views showing a state in which the powers having a plurality of rated voltages are supplied from the power source module 1900 to the logic module 1400, in the conventional all-in-one unit 1130. In this case, FIGS. 25 and 26 show an embodiment of the case of the all-in-one unit 1130, however, the same matter is applied to the control unit 1110.

As shown in FIG. 26, the power is supplied from the power source module 1900 to the logic module 1400 by connecting a power source module substrate 1910 to a logic module substrate 1440 by a bus bar 1610. The bus bar 1610 corresponds to a metal plate for supplying the power from the power source module 1900 to the logic module 1400. Since the great power is supplied from the power source module 1900 to the logic module 1400, a current-carrying capacity comes short in the normal wire harness. Accordingly, the power is supplied by employing the metal plate such as the bus bar 1610. The power source module substrate 1910 is arranged in the innermost side of the upper stage of the all-in-one unit casing 1220 together with a power source module reinforcing plate 1920. In the case of the control unit casing 1200, the power source module substrate 1910 is arranged in a rear face side in the same manner in addition to the front face side. When the power source module 1900 is received in the all-in-one unit casing 1220, an electric connector provided in the power source module 1900 is fitted to an electric connector provided in the power source module substrate 1910. On the other hand, the logic module substrate 1440 is arranged in the innermost side in the middle stage of the all-in-one unit casing 1220 together with a logic module reinforcing plate 1450. In the case of the control unit casing 1200, the logic module substrate 1440 is arranged in a rear face side in the same manner in addition to the front face side. When the logic module 1400 is received in the all-in-one unit casing 1220, an electric connector provided in the logic module 1400 is fitted to an electric connector provided in the logic module substrate 1440. As mentioned above, it is possible to electrically connect the power source module 1900 and the logic module 1400 to each other. Further, it is possible to supply the power from the power source module 1900 to the logic module 1400. As mentioned above, it is conventionally necessary to supply a plurality of voltages to the logic module 1400. Accordingly, as shown in FIG. 26, the kinds and the number of the bus bar 1610 for connecting the power source module substrate 1910 to the logic module substrate 1440 are increased, and the arrangement of the bus bar 1610 is required to be designed. As shown in FIG. 26, there is a case that it is necessary to arrange the long bus bar 1610 up to the side surface portion between the power source module substrate 1910 and the logic module substrate 1440.

FIG. 25 shows a state in which the power source module 1900 and the logic module 1400 are connected therebetween by the bus bar 1610 in the inner portion of the conventional all-in-one unit 1130. As shown in FIG. 25, in the conventional all-in-one unit 1130, the power source module 1900 is received in the upper stage of the all-in-one unit casing 1220, and the logic module 1400 is received in the middle stage. Accordingly, since there is established a positional relation that the logic module fan 1410 is arranged between the power source module 1900 and the logic module 1400, it is unavoidable that the length of the bus bar 1610 is increased at such a degree that the logic module fan 1410 is held therebetween.

Figure 27:
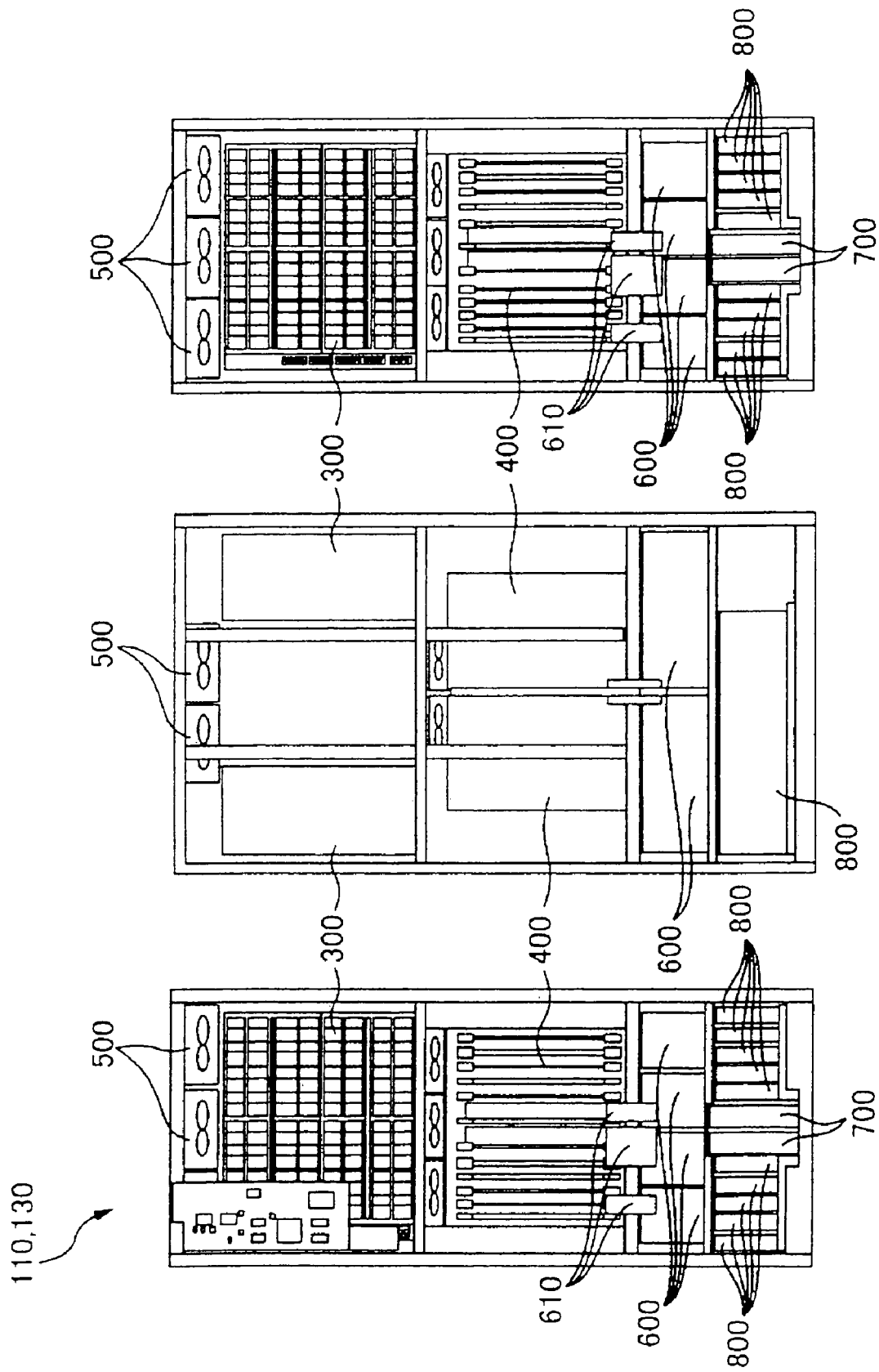
FIG. 27 is a view for explaining a bus bar provided in the storage apparatus in accordance with the present embodiment.

On the other hand, in the all-in-one unit 130 in accordance with the present embodiment, the DC power source 600 is received in the lower stage of the casing 200, and the logic module 400 is received in the middle stage thereof. In the all-in-one unit 130 in accordance with the present embodiment, the power is supplied from the DC power source 600 to the logic module 400 by using the bus bar 610. However, since the DC power source 600 is received in the lower portion of the logic module 400, as shown in FIG. 27, it is possible to avoid the positional relation that the logic module fan 410 is arranged between the logic module 400 and the DC power source 600. Accordingly, it is possible to shorten the length of the bus bar 610.

Figure 28:
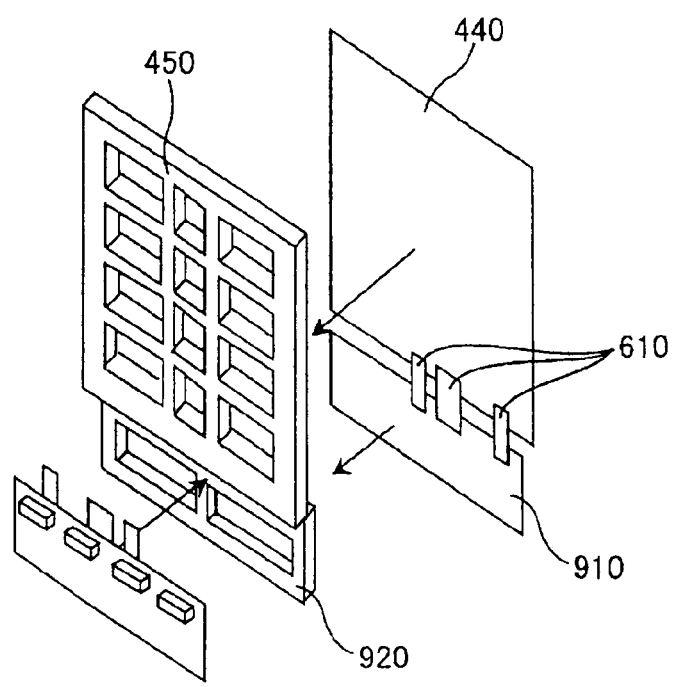
FIG. 28 is a view for explaining the bus bar provided in the storage apparatus in accordance with the present embodiment.

Further, as shown in FIG. 28, in the all-in-one unit 130 in accordance with the present embodiment, a logic module substrate 440 and a DC power source substrate 910 are connected therebetween by the bus bar 610. Further, the DC power source substrate 910 is arranged in the innermost side of the lower stage of the casing 200 together with a DC power source reinforcing plate 920. The DC power source substrate 910 is arranged in a rear face side in the same manner in addition to the front face side. Further, when the DC power source 600 is received in the casing 200, the electric connector provided in the DC power source 600 is fitted to the electric connector provided in the power source substrate 1910. On the other hand, the logic module substrate 440 is arranged in the innermost side of the middle stage of the casing 200 together with a logic module reinforcing plate 450. The logic module substrate 440 is arranged in a rear face side in the same manner in addition to the front face side. Further, when the logic module 400 is received in the casing 200, the electric connector provided in the logic module 400 is fitted to the electric connector provided in the logic module substrate 440. In the manner mentioned above, the DC power source 600 and the logic module 400 are electrically connected to each other. Further, the power is supplied from the DC power source 600 to the logic module 400.

As shown in FIGS. 27 and 28, in the present embodiment, the number of the bus bar 610 can be reduced in comparison with the conventional one. Further, the length of the buss bar 610 can be shortened. This is because in the storage apparatus 100 in accordance with the present embodiment, the voltage of the dc power supplied from the DC power source 600 to the logic module 400 is set to one kind, and the DC power source 600 is received in the lower portion of the logic module 400, as mentioned above.

Next, a description will be given of a structure of the drive unit 120 in accordance with the present embodiment with reference to FIGS. 13 to 16.

The drive unit 120 is structured such that the disc drive module 300, the DC power source 600, the AC-BOX 700, the battery 800 and the fan 500 are received in the casing 300. The respective modules and the like are the same as those employed in the control unit 110 and the all-in-one unit 130. In the storage apparatus 100 in accordance with the present embodiment, all of the control unit 110, the drive unit 120 and the all-in-one unit 130 are structured by using the common casing 200. Further, in the drive unit 120, the disc drive module 300 can be received in the middle stage of the casing 200 in which the logic module 400 is received in the control unit 110. This is because in the present embodiment, the height and the width of the logic module 400 can be made approximately equal to the height and the width of the disc drive module 300, and the upper stage and the middle stage of the casing 200 can be made approximately equal to each other in the height and the width, as mentioned above.

The fan 500 sucks the air in the inner portion of the disc drive modules 300 which are respectively received in the upper stage and the middle stage of the casing 200, and discharges the air to the outer portion of the drive unit 120. Accordingly, it is possible to discharge the heat generated from the disc drive 310 received in the disc drive module 300 to the outer portion of the drive unit 120. In this case, the drive unit 120 is provided with the air duct 210 in the inner portion of the casing 200, and the air in the inner portion of the disc drive module 300 received in the middle stage of the casing 200 is discharged to the outer portion of the drive unit 120 through the inner portion of the air duct 210 by the fan 500.

A description will be given of a cooling structure of the storage apparatus 100 in accordance with the present embodiment with reference to FIGS. 17 to 24.

Figure 17:
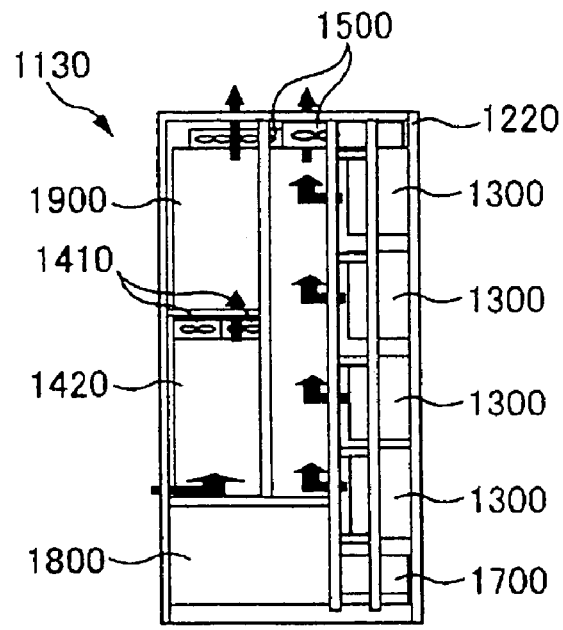
FIG. 17 is a view for explaining a cooling structure for the control unit of the conventional storage apparatus.
Figure 18:
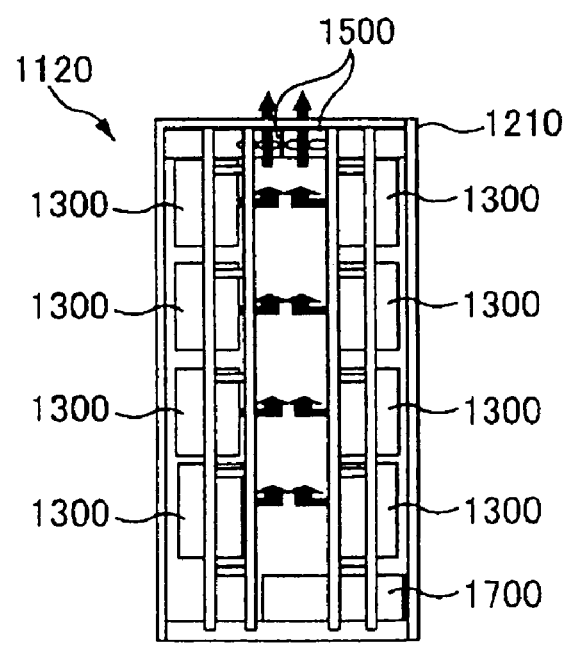
FIG. 18 is a view for explaining a cooling structure for the drive unit of the conventional storage apparatus.

First, a description will be given of the cooling structure of the conventional storage apparatus 1100 with reference to FIGS. 17 and 18. FIG. 17 shows a cooling structure of the all-in-one unit 1130 of the conventional storage apparatus 1100. FIG. 18 shows a cooling structure of the drive unit 1120 of the conventional storage apparatus 1100. Arrows described in FIGS. 17 and 18 show a flow state of a cooling wind. The same matter is applied to the other drawings. The cooling structure of the control unit 1110 is the same as the cooling structure in the logic portion 1420 and the power module 1900 of the all-in-one unit 1130.

The all-in-one unit 1130 is structured such that the logic portion 1420, the logic module fan 1410, the power source module 1900, the battery 1800 and the fan 1500 are received in the front face side, and the disc drive module 1300, the AC-BOX 1700, and the fan 1500 are received in the rear face side.

The front face side of the all-in-one unit 1130 is cooled by discharging the air in the inner portion of the logic portion 1420 and the power source module 1900 to the outer portion of the all-in-one unit 1130, by means of the fan 1500 and the logic module fan 1410. In other words, the air in the inner portion of the logic portion 1420 is sucked by the logic module fan 1410, and is discharged to the outer portion of the all-in-one unit 1130 together with the air in the inner portion of the power source module 1900 by the fan 1500.

The rear face side of the all-in-one unit 1130 is cooled by discharging the air in the inner portion of the disc drive module 1300 to the outer portion of the all-in-one unit 1130, by means of the fan 1500. In other words, the air in the inner portion of the disc drive module 1300 is discharged to the outer portion of the all-in-one unit 1130 through the space formed between the disc drive module 1300 and the logic module 1400 or the power source module 1900 by the fan 1500, in the inner portion of the all-in-one unit casing 1220, as shown in FIG. 17.

The drive unit 1120 is cooled in the same manner as that of the rear face side of the all-in-one unit 1130, as shown in FIG. 18. In other words, the air in the inner portion of the disc drive module 1300 is discharged to the outer portion through the space formed between the disc drive module 1300 in the front face side and the disc drive module 1300 in the rear face side by the fan 1500, in the inner portion of the drive unit casing 1230, as shown in FIG. 18.

Figure 19:
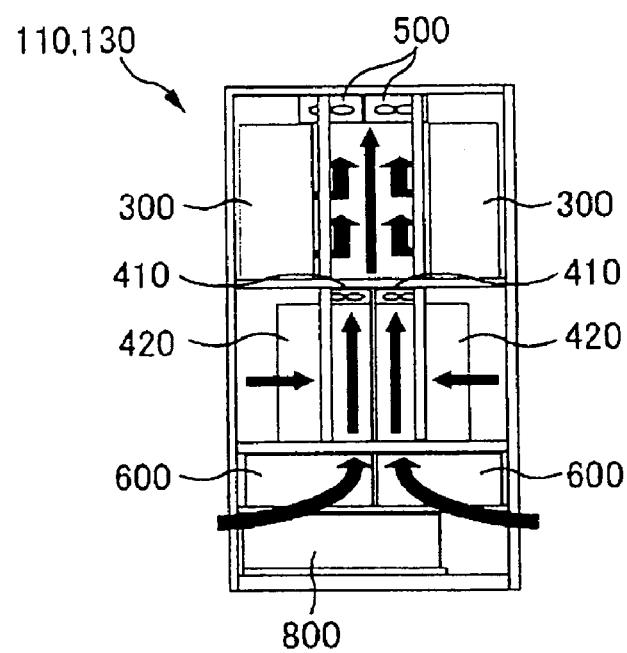
FIG. 19 is a view for explaining a cooling structure for the control unit of the storage apparatus in accordance with the present invention.
Figure 20:
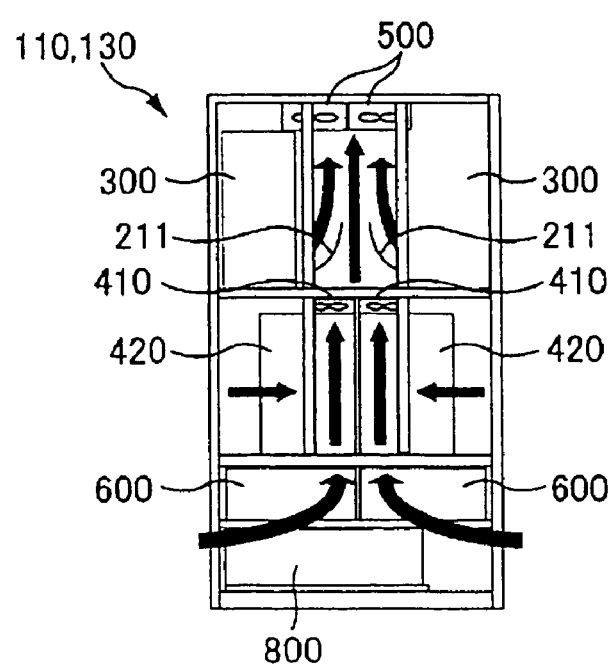
FIG. 20 is a view for explaining the cooling structure for the control unit of the storage apparatus in accordance with the present invention.
Figure 21:
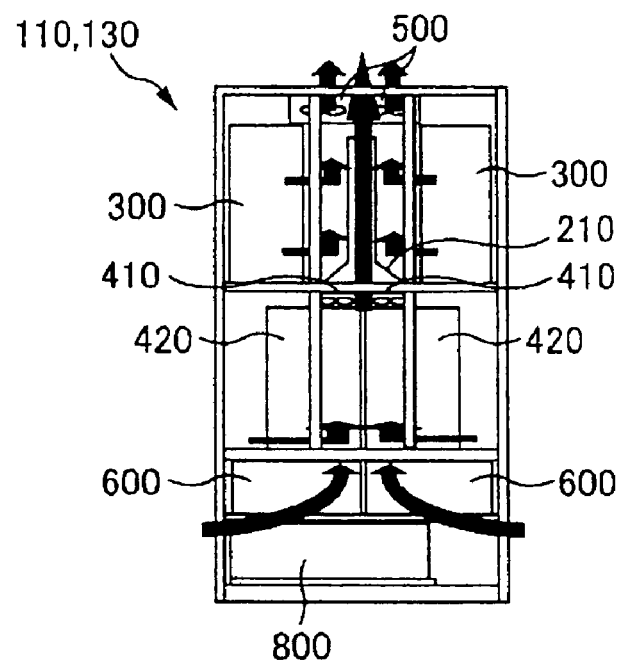
FIG. 21 is a view for explaining the cooling structure for the control unit of the storage apparatus in accordance with the present invention.
Figure 22:
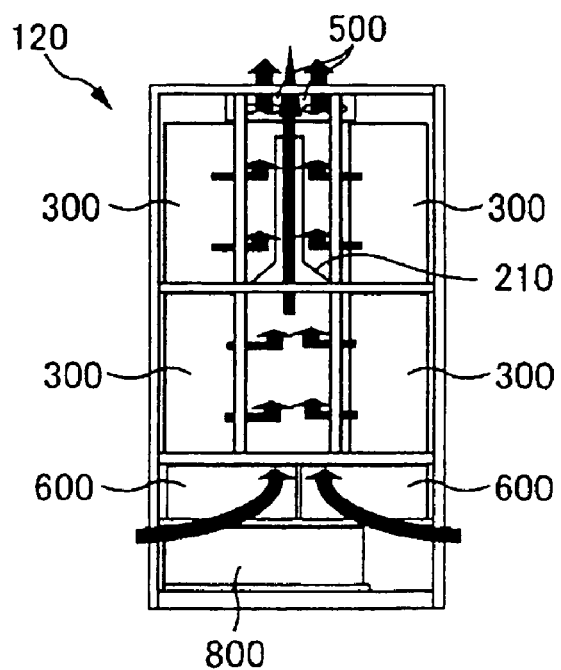
FIG. 22 is a view for explaining a cooling structure for the drive unit of the storage apparatus in accordance with the present embodiment.

Next, a description will be given of a cooling structure of the storage apparatus 100 in accordance with the present embodiment with reference to FIGS. 19 to 24. FIGS. 19 to 21 are views for explaining a cooling structure of the control unit 110 or the all-in-one unit 130. FIG. 22 is a view for explaining a cooling structure of the drive unit 120.

The control unit 110 or the all-in-one unit 130 in accordance with the present embodiment is provided with the fan 500, the disc drive module 300, the logic portion 420, the logic module fan 410, and the power source portion (the DC power source 600, the AC-BOX 700 and the battery 800). The control unit 110 and the all-in-one unit 130 are cooled by discharging the air in the inner portion of the control unit 110 and the all-in-one unit 130 to the outer portion, by means of the fan 500 and the logic module fan 410. At this time, it is desirable in view of an improvement of cooling efficiency that the air in the inner portion of the casing 200 is discharged to the outer portion as smooth as possible. In the control unit 110 and the all-in-one unit 130 in accordance with the present embodiment, the disc drive module 300 is received in the upper stage, the logic module 400 is received in the middle stage, and the power source portion is received in the lower stage. In the control unit 110 and the all-in-one unit 130 in accordance with the present embodiment, it is possible to improve an exhaust efficiency on the basis of the arrangement mentioned above.

In other words, as shown in FIG. 19, the disc drive module 300 received in the upper stage of the casing 200 is short in depth in comparison with the logic module 400 and the power source portion. Accordingly, in the case that the disc drive module 300 is received in the casing, it is possible to secure a large space formed between the disc drive module 300 received in the front face side and the disc drive module 300 received in the rear face side. Accordingly, it is possible to secure a large ventilation path for the cooling wind sucked by the fan 500. In other words, it is possible to efficiently discharge the air in the inner portion of the casing 200 to the outer portion.

Further, as shown in FIG. 19, the power source portion received in the lower stage of the casing 200 is long in depth in comparison with the disc drive module 300 and the logic module 400. Accordingly, in the case that the power source portion is received in the upper stage or the middle stage of the casing 200, the ventilation path for the cooling wind is closed, however, in the control unit 110 and the all-in-one unit 130 in accordance with the present embodiment, the ventilation path is not closed by receiving the power source portion in the lower stage.

Further, the logic module 400 received in the middle stage of the casing 200 is short in depth in comparison with the disc drive module 300 received in the upper stage, however, is short in depth in comparison with the power source portion received in the lower stage. Accordingly, it is possible to secure the space for the ventilation path in the middle stage while securing the large ventilation path in the upper stage of the casing 200 by receiving the logic module 400 in the middle stage of the casing 200. In this case, since the logic module 400 is structured such that the logic module 400 can ventilate the inner side of the module in a vertical direction, as is different from the disc drive module 300, it is possible to receive the logic module 400 in the front face side and the logic module 400 in the rear face side in such a manner that the logic module 400 in the front face side and the logic module 400 in the rear face side are arranged close to each other in the inner portion of the casing 200, as shown in FIG. 19. In accordance with the structure mentioned above, it is possible to efficiently feed the air in the inner portion of the power source portion and the logic module 400 which is sucked by the logic module fan 410, to the ventilation path in the upper stage of the casing 200.

Figure 23:
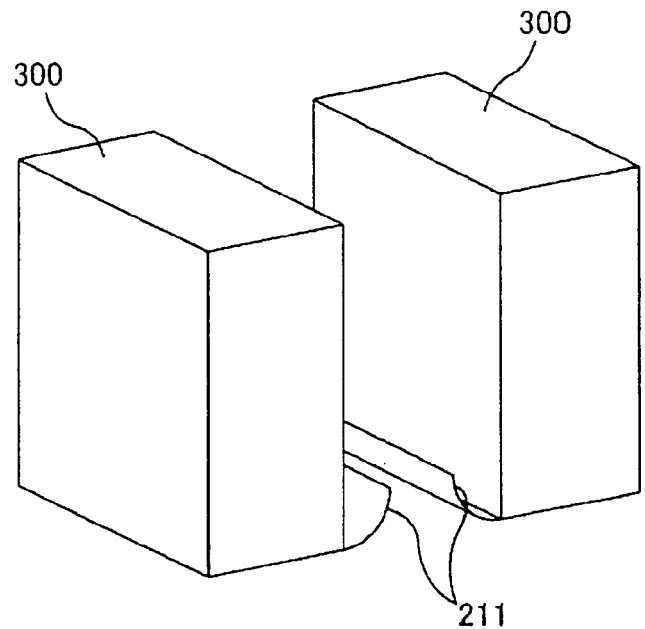
FIG. 23 is a view showing a rectifier stack provided in the storage apparatus in accordance with the present embodiment.

In the case that the cooling structure shown in FIG. 19 is employed, the cooling wind from the disc drive module 300 and the cooling wind from the logic module 400 flow together in the ventilation path in the upper stage of the casing 200. In the case that the flow of the cooling wind gets out of order at a time when the cooling winds flow together, a reduction in the exhaust efficiency is caused. Accordingly, FIG. 20 is a view showing a cooling structure for inhibiting the turbulence generated at a time when the cooling winds flow together. In other words, as shown in FIG. 20, a rectifier fin 211 is arranged within the casing 200. Accordingly, it is possible to inhibit the turbulence of the cooling wind generated at a time when the cooling wind from the disc drive module 300 collides with the cooling wind from the logic module 400. A state in which the rectifier fin 211 is arranged is shown in FIG. 23.

Figure 24:
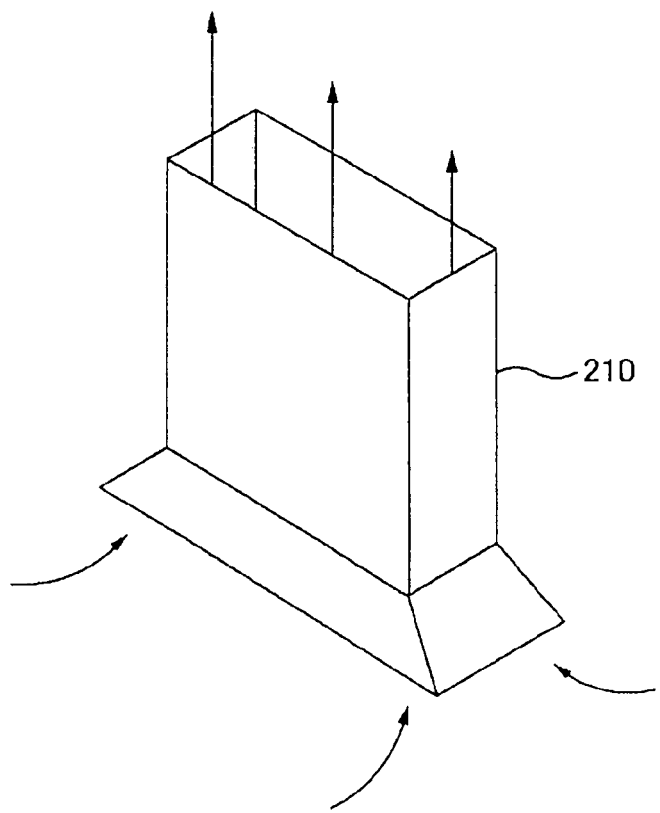
FIG. 24 is a view showing the rectifier stack provided in the storage apparatus in accordance with the present embodiment.

However, even in the case that the rectifier fin 211 is employed, the cooling wind from the disc drive module 300 and the cooling wind from the logic module 400 flow together in due course until reaching the fan 500. A cooling structure shown in FIG. 21 is provided for the purpose of preventing the cooling wind from the disc drive module 300 and the cooling wind from the logic module 400 from flowing together so as to further increase the exhaust efficiency. In other words, as shown in FIG. 21, the air duct 210 is arranged in the inner portion of the casing 200. A state in which the air duct 210 is arranged is shown in FIG. 24. By arranging the air duct 210 within the casing 200, the cooling wind from the logic module 400 reaches the fan 500 through an inner portion of the air duct 210, and the cooling wind from the disc drive module 300 reaches the fan 500 along an outer wall of the air duct 210. Accordingly, it is possible to prevent the cooling wind from the disc drive module 300 and the cooling wind from the logic module 400 from flowing together. In accordance with the structure mentioned above, it is possible to further increase the exhaust efficiency of the control unit 110 and the all-in-one unit 130. In this case, it is desirable to arrange the upper portion of the air duct 210 and the fan 500 appropriately apart from each other without closely contact with each other. This is because the suction force obtained by the fan 500 with respect to the air in the inner portion of the air duct 210 becomes weak by the closely contact.

FIG. 22 shows the cooling structure in the drive unit 120 in accordance with the present embodiment.

The cooling structure in the drive unit 120 is a structure provided with the air duct 210 in the inner portion, in the same manner as the cooling structure in the control unit 110 and the all-in-one unit 130 shown in FIG. 21. However, the cooling structure is different from the cooling structure in the control unit 110 and the all-in-one unit 130, in a point that the disc drive module 300 is received in the middle stage. In this case, the cooling wind from the disc drive module 300 in the middle stage is discharged to the outer portion of the drive unit 120 through the inner portion of the air duct 210. Further, the cooling wind from the disc drive module 300 in the upper stage is discharged to the outer portion of the drive unit 120 along the outer wall of the air duct 210. As mentioned above, in the drive unit 120, by arranging the air duct 210 in the casing 200, it is possible to discharge the cooling wind from the disc drive module 300 in the upper stage and the cooling wind from the disc drive module 300 and the power source portion in the middle stage and the lower stage without flowing together. Accordingly, in the drive unit 120, it is possible to efficiently cool in the same manner as the control unit 110 and the all-in-one unit 130.

As described above, in the storage apparatus in accordance with the present embodiment, it is possible to make the casing for structuring the control unit, the drive unit and the all-in-one unit in common. Accordingly, it is possible to easily structure and change the storage apparatus in correspondence to the user's needs. Further, it is possible to make the parts used at a time of manufacturing the storage apparatus in common and it is possible to easily manufacture and reduce the cost.

Further, since the power source portion is received in the lower portion of the casing, it is possible to remove a necessity of arranging the wiring for the ac power in the inner portion of the casing. Further, since the voltage of the dc power supplied from the power source portion to the logic module can be made one kind, it is possible to remove a necessity of arranging the wiring for supplying the dc powers having the different voltages in the inner portion of the casing. Accordingly, it is possible to simplify the wire arranging within the casing, and it is possible to easily manufacture, maintain and repair the storage apparatus and it is possible to improve a safety. Further, since it is possible to make it hard to be exposed to the influence with respect to the noise, it is possible to improve a reliability of the storage apparatus. Further, it is possible to reduce the kinds and the number of the bus bar used for supplying the power from the power source portion to the logic module, and it is possible to make the length short. Accordingly, it is possible to reduce the number of the parts constituting the storage apparatus, and it is possible to achieve easy maintenance and repair of the storage apparatus and an improvement of an assembling operability.

The description is given above of the present embodiments, however, the embodiments mentioned above are provided for making the understanding of the present invention easy, and do not limit the present invention.

It should be further understood by those skilled in the art that the foregoing description has been made on embodiments of the invention and that various changes and modifications may be made in the invention without departing from the spirit of the invention and the scope of the appended claims.

The present invention can provide the casing for the storage apparatus and the storage apparatus.

What is claimed is:

1. A storage apparatus comprising:
    a casing including:
        a first receiving portion for receiving a disc drive box in which a plurality of disc drives are received in a line, said first receiving portion being approximately equal in height and width to said disc drive box;
        a second receiving portion for receiving a control portion box in which a plurality of control boards for executing a control relating to data input and output processes with respect to said disc drives are received in a line, said second receiving portion being approximately equal in height and width to said first receiving portion; and
        a third receiving portion for receiving a power source portion for supplying an electric power to said control boards and said disc drives, and said third receiving portion is provided below said second receiving portion,
        said first receiving portion and said second receiving portion are structured such that even in the case that any of said disc drive box and said control portion box is received in said second receiving portion, a cooling wind passes from said received box to said first receiving portion;
    a plurality of said disc drives received in said disc drive box received in said first receiving portion;
    a plurality of said control boards received in said control portion box received in said second receiving portion; and
    said power source portion received in said third receiving portion.

2. A storage apparatus as claimed in claim 1, wherein the electric power to said control boards and said disc drives by said power source portion is a direct current electric power having a uniform rated voltage.

3. A storage apparatus as claimed in claim 1, further comprising an air duct arranged within the first receiving portion, said air duct having an outwardly-flaring lower portion open to the second receiving portion and a substantially straight upper portion open at an end thereof opposite said outwardly-flaring lower portion.

4. A storage apparatus as claimed in claim 3, wherein said air duct is above said control boards.

5. A storage apparatus as claimed in claim 1, further comprising:
    an air duct arranged within the first receiving portion to define an inner air flow path within the air duct and an outer air flow path outside the air duct and within the first receiving portion, said air duct having an outwardly-flaring lower portion open to the second receiving portion and a substantially straight upper portion open at an end thereof opposite said outwardly-flaring lower portion;
    wherein said air duct is further arranged within said first receiving portion so that all air flowing from said second receiving portion into said first receiving portion flows into said air duct in said inner flow path substantially without collision or turbulence with air flowing in said outer flow path outside said air duct within said first receiving portion.

6. A storage apparatus as claimed in claim 5, wherein said air duct is further arranged in a central portion within said first receiving portion so as to provide for first and second disc drive boxes on opposite sides thereof, so that all air flowing from said second receiving portion into said first receiving portion between said first and second disc drive boxes flows into said air duct in said inner flow path substantially without collision or turbulence with air flowing in said outer flow path outside said air duct within said first receiving portion.

7. A storage apparatus comprising:
a plurality of casings, each casing including:
a first receiving portion for receiving a disc drive box in which a plurality of disc drives are received in a line, said first receiving portion being approximately equal in height and width to said disc drive box;
a second receiving portion for receiving a control portion box in which a plurality of control boards for executing a control relating to data input and output processes with respect to said disc drives are received in a line, said second receiving portion being approximately equal in height and width to said first receiving portion; and
a third receiving portion for receiving a power source portion for supplying an electric power to said control boards and said disc drives, and said third receiving portion is provided below said second receiving portion,
said first receiving portion and said second receiving portion are structured such that even in the case that any of said disc drive box and said control portion box is received in said second receiving portion, a cooling wind passes from said received box to said first receiving portion;
wherein in one of said casings for the storage apparatus, said disc drive box, in which a plurality of said disc drives are received, is received in said first receiving portion; said control portion box, in which a plurality of said control boards are received, is received in said second receiving portion; and said power source portion is received in said third receiving portion; and in another of said casings for the storage apparatus, said disc drive box, in which a plurality of said disc drives are received, is received in each of said first receiving portion and said second receiving portion; and said power source portion is received in said third receiving portion.

8. A storage apparatus as claimed in claim 7, wherein the electric power to said control boards and said disc drives by said power source portion is a direct current electric power having a uniform rated voltage.

9. A storage apparatus as claimed in claim 7, further comprising an air duct arranged within the first receiving portion, said air duct having an outwardly-flaring lower portion open to the second receiving portion and a substantially straight upper portion open at an end thereof opposite said outwardly-flaring lower portion.

10. A storage apparatus as claimed in claim 9, wherein said air duct is above said control boards.

11. A storage apparatus as claimed in claim 7, further comprising:
an air duct arranged within the first receiving portion to define an inner air flow path within the air duct and an outer air flow path outside the air duct and within the first receiving portion, said air duct having an outwardly-flaring lower portion open to the second receiving portion and a substantially straight upper portion open at an end thereof opposite said outwardly-flaring lower portion;
wherein said air duct is further arranged within said first receiving portion so that all air flowing from said second receiving portion into said first receiving portion flows into said air duct in said inner flow path substantially without collision or turbulence with air flowing in said outer flow path outside said air duct within said first receiving portion.

12. A storage apparatus as claimed in claim 11, wherein said air duct is further arranged in a central portion within said first receiving portion so as to provide for first and second disc drive boxes on opposite sides thereof, so that all air flowing from said second receiving portion into said first receiving portion between said first and second disc drive boxes flows into said air duct in said inner flow path substantially without collision or turbulence with air flowing in said outer flow path outside said air duct within said first receiving portion.

13. A casing for a storage apparatus comprising:
a first receiving portion sized to receive a disc drive box in which a plurality of disc drives are received in a line, said first receiving portion being approximately equal in height and width to said disc drive box;
a second receiving portion sized to alternatively receive either of a disc drive box or a control portion box in which a plurality of control boards for executing a control relating to data input and output processes with respect to said disc drives in said disc drive box in said first receiving portion are received in a line, said second receiving portion being approximately equal in height and width to said first receiving portion; and
an air duct arranged within the first receiving portion, said air duct having an outwardly-flaring portion open to the second receiving portion and a substantially straight portion open at an end thereof opposite said outwardly-flaring portion,
wherein said first receiving portion and said second receiving portion are structured such that a cooling wind passes from said disc drive box in said second receiving portion into said air duct in said first receiving portion when said disc drive box is received in said second receiving portion, and from said control portion box in said second receiving portion into said air duct in said first receiving portion when said control portion box is received in said second receiving portion.

14. A storage apparatus comprising:
a casing;
a disc drive box in which a plurality of disc drives are received in a line; and
a control portion box in which a plurality of control boards for executing a control relating to data input and output processes with respect to said disc drives in said disc drive box are received in a line;
wherein said casing includes:
a first receiving portion sized to receive said disc drive box, said first receiving portion being approximately equal in height and width to said disc drive box; and
a second receiving portion sized to alternatively receive either of said disc drive box or said control portion box, said second receiving portion being approximately equal in height and width to said first receiving portion,
wherein said first receiving portion and said second receiving portion are sized such that the disk drive box can be received in either said first receiving portion or said second receiving portion, and so that the control portion box can be received in said second receiving portion when said disc drive box is received in said first receiving portion, and wherein said first receiving portion and said second receiving portion are structured such that a cooling wind passes from said disc drive box in said second receiving portion into said first receiving portion when said disc drive box is received in said second receiving portion, and from said control portion box in said second receiving portion into said first receiving portion when said control portion box is received in said second receiving portion.

15. A storage apparatus as claimed in claim 14, wherein said second receiving portion is positioned lower relative to said first receiving portion, such that said cooling wind passes from said disc drive box in said second receiving portion upwardly into said first receiving portion when said disc drive box is received in said second receiving portion, and from said control portion box in said second receiving portion upwardly into said first receiving portion when said control portion box is received in said second receiving portion.

16. A storage apparatus as claimed in claim 14, further comprising a fan portion arranged to draw and exhaust said cooling wind from said first receiving portion after said cooling wind passes from said disc drive box in said second receiving portion into said first receiving portion when said disc drive box is received in said second receiving portion, and after said cooling wind passes from said control portion box in said second receiving portion into said first receiving portion when said control portion box is received in said second receiving portion.

17. A storage apparatus as claimed in claim 14, further comprising:

an air duct arranged within the first receiving portion, said air duct having an outwardly-flaring portion open to the second receiving portion and a substantially straight portion open at an end thereof opposite said outwardly-flaring portion, wherein said first receiving portion and said second receiving portion are structured such that said cooling wind passes from said disc drive box in said second receiving portion into said air duct in said first receiving portion when said disc drive box is received in said second receiving portion, and from said control portion box in said second receiving portion into said air duct in said first receiving portion when said control portion box is received in said second receiving portion.

18. A storage apparatus as claimed in claim 14, wherein said casing for the storage apparatus is provided with a third receiving portion sized to receive a power source portion for supplying an electric power to said control boards and said disc drives, and said third receiving portion is provided below said second receiving portion.

19. A storage apparatus as claimed in claim 14, further comprising an air duct arranged within the first receiving portion, said air duct having an outwardly-flaring lower portion open to the second receiving portion and a substantially straight upper portion open at an end thereof opposite said outwardly-flaring lower portion.

20. A storage apparatus as claimed in claim 19, wherein said air duct is above said second receiving portion.

21. A storage apparatus as claimed in claim 14, further comprising:

an air duct arranged within the first receiving portion to define an inner air flow path within the air duct and an outer air flow path outside the air duct and within the first receiving portion, said air duct having an outwardly-flaring lower portion open to the second receiving portion and a substantially straight upper portion open at an end thereof opposite said outwardly-flaring lower portion;

wherein said air duct is further arranged within said first receiving portion so that all air flowing from said second receiving portion into said first receiving portion flows into said air duct in said inner flow path substantially without collision or turbulence with air flowing in said outer flow path outside said air duct within said first receiving portion.

22. A storage apparatus as claimed in claim 21, wherein said air duct is further arranged in a central portion within said first receiving portion so as to provide for first and second disc drive boxes on opposite sides thereof, so that all air flowing from said second receiving portion into said first receiving portion between said first and second disc drive boxes flows into said air duct in said inner flow path substantially without collision or turbulence with air flowing in said outer flow path outside said air duct within said first receiving portion.

* * * * *